US012736125B2

(12) United States Patent
Zhang et al.

(10) Patent No.: US 12,736,125 B2
(45) Date of Patent: Sep. 15, 2026

(54) ELECTRIC DRIVE ASSEMBLY AND ELECTRIC DEVICE

(71) Applicants: CONTEMPORARY AMPEREX INTELLIGENCE TECHNOLOGY (SHANGHAI) LIMITED, Shanghai (CN); CONTEMPORARY AMPEREX TECHNOLOGY CO., LIMITED, Ningde City (CN)

(72) Inventors: Junhui Zhang, Shanghai (CN); Ji Xia, Shanghai (CN)

(73) Assignees: CONTEMPORARY AMPEREX INTELLIGENCE TECHNOLOGY (SHANGHAI) LIMITED, Shanghai (CN); CONTEMPORARY AMPEREX TECHNOLOGY CO., LIMITED, Ningde City (CN)

( * ) Notice: Subject to any disclaimer, the term of this patent is extended or adjusted under 35 U.S.C. 154(b) by 0 days.

(21) Appl. No.: 18/749,444

(22) Filed: Jun. 20, 2024

(65) Prior Publication Data

US 2024/0344604 A1 Oct. 17, 2024

Related U.S. Application Data

(63) Continuation of application No. PCT/CN2023/134072, filed on Nov. 24, 2023.

(30) Foreign Application Priority Data

Apr. 17, 2023 (CN) ........................ 202310412120.1

(51) Int. Cl.
*F16H 57/04* (2010.01)
*B60K 1/02* (2006.01)
(Continued)

(52) U.S. Cl.
CPC ....... *F16H 57/0476* (2013.01); *F16H 57/043* (2013.01); *H02K 9/19* (2013.01);
(Continued)

(58) Field of Classification Search
CPC ..... F16H 57/043; F16H 57/0476; B60K 1/02; H02K 9/19
See application file for complete search history.

(56) References Cited

U.S. PATENT DOCUMENTS 9,266,423 B2 * 2/2016 Hoshinoya ............... B60K 6/48
11,781,643 B2 * 10/2023 Fujimoto ............ F16H 57/0417
184/6.12
(Continued)

FOREIGN PATENT DOCUMENTS

CN 112421889 A 2/2021
CN 114142638 A 3/2022
(Continued)

OTHER PUBLICATIONS

International Search Report for PCT application No. PCT/CN2023/134072, dated Feb. 13, 2024.
(Continued)

*Primary Examiner* — Minh Truong
(74) *Attorney, Agent, or Firm* — Ladas & Parry LLP

(57) ABSTRACT

Disclosed are an electric drive assembly and an electric device. The electric drive assembly includes a motor, a speed shifting mechanism connected to the motor, and a cooling system configured to supply lubricating oil to the motor and the speed shifting mechanism in sequence. With the cooling system provided, lubricating oil is sequentially supplied to the motor and the speed shifting mechanism, reducing the loss of the cooling capacity of lubricating oil in
(Continued)

the speed shifting mechanism, improving the cooling efficiency and the utilization rate of the cooling capacity, and reducing the loss.

14 Claims, 9 Drawing Sheets

(51) Int. Cl.
*H02K 9/19* (2006.01)
*F16H 57/02* (2012.01)

(52) U.S. Cl.
CPC ...... *B60K 1/02* (2013.01); *F16H 2057/02034* (2013.01); *F16H 2057/02043* (2013.01)

(56) References Cited

U.S. PATENT DOCUMENTS 11,894,751 B2* 2/2024 Nakata .................. H02K 5/203
2012/0271496 A1* 10/2012 Yamamoto ........... B60K 17/043 180/65.265
2013/0145879 A1* 6/2013 Nakamura .......... F16H 57/0441 74/467
2017/0271958 A1 9/2017 Kitta et al.
2020/0284338 A1* 9/2020 Suyama .................. B60L 15/20
2021/0146781 A1 5/2021 Maughan
2021/0188099 A1* 6/2021 Janssen .................. H02K 7/006
2022/0049768 A1 2/2022 Nakamatsu et al.
2023/0114407 A1 4/2023 Liu et al.
2023/0136544 A1* 5/2023 Nakata .................. F16H 57/043 184/6.12
2024/0175488 A1* 5/2024 Yanagihara ......... F16H 57/0426
2024/0181871 A1* 6/2024 Yanagihara ......... F16H 57/0436

FOREIGN PATENT DOCUMENTS

CN 216805098 U 6/2022
CN 115811179 A 3/2023
CN 220016027 U 11/2023
WO 2022270089 A1 12/2022

OTHER PUBLICATIONS

Written Opinion of International Searching Authority for PCT application No. No. PCT/CN2023/134072, dated Feb. 13, 2024.
Extended European Search Report for EP application No. 24170383.4, dated Sep. 30, 2024.
First Office Action for EP application No. 24170383.4, dated Jun. 27, 2025.
Second Office Action for EP application No. 24170383.4, dated Dec. 23, 2025.

* cited by examiner

ELECTRIC DRIVE ASSEMBLY AND ELECTRIC DEVICE

CROSS-REFERENCE TO RELATED APPLICATIONS

This application is a continuation of International Patent Application No. PCT/CN2023/134072, filed on Nov. 24, 2023, which claims priority to Chinese Patent Application No. 202310412120.1, filed on Apr. 17, 2023. The entire contents of these applications are incorporated herein by reference.

TECHNICAL FIELD

This application belongs to the field of electric drive technology, more specifically, to an electric drive assembly and an electric device.

BACKGROUND

The statements herein are to provide only background information related to this application and do not necessarily constitute the prior art. Energy saving and emission reduction is the key to the sustainable development of automotive industry, and electric vehicles have become an important part of the sustainable development of automotive industry due to their advantages of energy saving and environmental protection. For an electric vehicle, the electric drive assembly is the power source of the electric vehicle, and lubrication and cooling are effective guarantees for the smooth operation of the electric drive assembly. At present, the cooling efficiency of lubricating oil passage of the electric drive assembly is low and its loss is large.

SUMMARY

It is an object of the embodiments of this application to provide an electric drive assembly and an electric device, so as to solve the problems of low cooling efficiency and large loss of a lubricating oil passage of an electric drive assembly in the related art.

In a first aspect, embodiments of this application provide an electric drive assembly including: a motor; a speed shifting mechanism connected to the motor; and a cooling system configured to supply lubricating oil to the motor and the speed shifting mechanism in sequence.

In the technical solution of the embodiment of this application, by providing a cooling system, lubricating oil is sequentially supplied to the motor and the speed shifting mechanism, reducing the loss of the cooling capacity of lubricating oil in the speed shifting mechanism, improving the cooling efficiency and the utilization rate of the cooling capacity, and reducing the loss.

In some embodiments, the motor includes a first heat generating portion and a second heat generating portion, and the cooling system sequentially supplies lubricating oil to the first heat generating portion and the second heat generating portion.

By supplying the lubricating oil to the first heat generating portion and the second heat generating portion of the motor in sequence through the cooling system, serial cooling of lubricating oil to the inside of the motor can be achieved, improving the utilization rate of cold energy and reducing the loss.

In some embodiments, the first heat generating portion includes a stator oil passage configured to cool a stator of the motor, and the cooling system is connected to the stator oil passage.

The stator oil passage is provided in the motor to cool the stator of the motor so that the stator can be smoothly operated.

In some embodiments, the second heat generating portion includes a rotor oil passage configured to cool a rotor of the motor, and the cooling system is connected to the rotor oil passage.

The rotor oil passage is provided in the motor to cool the rotor of the motor, so that the rotor can be smoothly operated.

In some embodiments, the electric drive assembly further includes a flow guiding structure configured to guide a part of lubricating oil flowing out of the stator oil passage to the rotor oil passage.

The flow guiding structure is configured to guide a part of lubricating oil flowing out of the stator oil passage to the rotor oil passage, not only realizing the series connection between the stator oil passage and the rotor oil passage, improving the utilization rate of the cooling capacity of lubricating oil, but also controlling the amount of lubricating oil entering the rotor oil passage through the design of the flow guiding structure, reducing oil agitation loss when the rotor rotates, and improving the working efficiency of the motor.

In some embodiments, the motor includes a rotor shaft, the rotor oil passage has a first shaft hole formed at the rotor shaft and extending in an axial direction of the rotor shaft, and the flow guiding structure is connected to the first shaft hole.

By providing the first shaft hole in the rotor shaft and connecting the guide structure with the first shaft hole, the lubricating oil can be delivered to the rotor shaft to cool the rotor and provide a good temperature environment for rotor operation.

In some embodiments, the speed shifting mechanism includes an input shaft coaxially connected to the rotor shaft, the input shaft has a second shaft hole formed in an axial direction of the input shaft; and the flow guiding structure is connected to the first shaft hole through the second shaft hole.

The input shaft is connected to the rotor shaft, so that the rotor shaft drives the input shaft to rotate. The second shaft hole is formed at the input shaft, so that the input shaft is connected to the first shaft hole. The flow guiding structure can be connected to the first shaft hole as long as the flow guiding structure is connected to the second shaft hole, so as to guide lubricating oil to the first shaft hole, thereby cooling the rotor.

In some embodiments, an end of the input shaft facing away from the rotor shaft is provided with a first bearing.

The electric drive assembly further includes a casing, and the casing has an accommodating cavity configured to accommodate the speed shifting mechanism and a first bearing chamber configured for mounting of the first bearing. The first bearing chamber is connected to each of the accommodating cavity and the cooling system, and the flow guiding structure guides a part of lubricating oil in the first bearing chamber to the second shaft hole.

The cooling system is connected with the first bearing chamber to supply lubricating oil into the first bearing chamber, and the flow guiding structure guides a part of lubricating oil in the first bearing chamber to the second shaft hole, so as to supply lubricating oil into the second shaft hole and in turn to supply lubricating oil into the first shaft hole, thereby cooling the rotor.

In some embodiments, the first bearing chamber has a first oil inlet connected to the cooling system, and the flow guiding structure includes a flow guiding disc mounted in the first bearing chamber. The flow guiding disc is configured to receive lubricating oil from the first oil inlet and guide the lubricating oil to the second shaft hole and the first bearing.

By providing the first oil inlet on the first bearing chamber to connect the cooling system, the cooling system can supply lubricating oil to the first bearing chamber. By providing the flow guiding disc, the lubricating oil entering the first oil inlet can flow to the second shaft hole and the first bearing. The lubricating oil is supplied to the first shaft hole through the second shaft hole to cool the rotor, and is supplied to the first bearing to lubricate the first bearing. The structure is simple, convenient for processing and manufacture, and can reduce an occupied space.

In some embodiments, the flow guiding disc is provided with a central tube extending in an axial direction of the flow guiding disc, and the central tube is connected to the second shaft hole. The flow guiding disc has a first flow guiding channel, and the first flow guiding channel has an end connected to the central tube and another end extending to a peripheral side surface of the flow guiding disc and located adjacent to the first oil inlet.

By providing the central tube on the flow guiding disc, the central tube can be connected to the second shaft hole and in turn to the first shaft hole. By providing the first flow guiding channel in the flow guiding disc, the first flow guiding channel can be connected to the peripheral side surface of the flow guiding disc and the central tube. One end of the first flow guiding channel away from the central tube is located adjacent to the first oil inlet, so that the flow guiding disc is configured to receive lubricating oil from the first oil inlet and guide the lubricating oil to the central tube. Then, the lubricating oil is guided to the second shaft hole through the central tube, and then flows to the first shaft hole, so as to cool the rotor. The structure is simple, convenient to manufacture, and easy to assemble.

In some embodiments, a side surface of the flow guiding disc close to the first bearing is provided with a collar protruding in an axial direction of the flow guiding disc, and the collar is fitted with an outer ring of the first bearing and has a recess. The flow guiding disc has a second flow guiding channel, and the second flow guiding channel has an end extending to the recess and another end extending to the peripheral side surface of the flow guiding disc.

By providing the collar on the flow guiding disc and fitting the collar with the outer ring of the first bearing, the first bearing can be positioned, and the lubricating oil flowing to the first bearing chamber through the first oil inlet can flow along the peripheral side surface of the flow guiding disc so as to facilitate lubricating oil entering the first flow guiding channel. By providing the recess inside the collar, and providing the second flow guiding channel on the flow guiding disc so as to connect the peripheral side surface of the flow guiding disc with the recess, the lubricating oil flowing along the peripheral side surface of the flow guiding disc can enter the recess through the second flow guiding channel, and then enter the first bearing from the recess, so as to lubricate the first bearing. The structure is simple, convenient to manufacture, and easy to assemble.

In some embodiments, the other end of the second flow guiding channel is located adjacent to the first oil inlet.

The other end of the second flow guiding channel is located on the peripheral side surface of the flow guiding disc and provided adjacent to the first oil inlet, so that the flow guiding disc is configured to receive lubricating oil from the first oil inlet and guide the lubricating oil to the recess.

In some embodiments, the other end of the first flow guiding channel is adjoined to the other end of the second flow guiding channel.

The other end of the first flow guiding channel is adjoined to the other end of the second flow guiding channel, which not only facilitates processing and manufacture, but also facilitates the lubricating oil entering the first oil inlet to flow to the second flow guiding channels.

In some embodiments, a partition plate is disposed between the other end of the first flow guiding channel and the other end of the second flow guiding channel.

By providing the partition plate, the lubricating oil entering the first oil inlet is guided to the first flow guiding channel and the second flow guiding channel, respectively, so as to control the amount of lubricating oil entering the first flow guiding channel and the second flow guiding channel, and in turn control the amount of lubricating oil entering the rotor shaft.

In some embodiments, the second flow guiding channel has a notch formed at the collar, and the notch is connected to the recess.

By providing the notch on the collar, the second flow guiding channel can be formed. The structure is simple, and convenient to manufacture.

In some embodiments, a housing of the motor has an oil return channel connected to an end of the first shaft hole facing away from the speed shifting mechanism; and the electric drive assembly further includes an oil sump connected to the oil return channel.

The oil return channel is formed at the housing of the motor to connect the first shaft hole with the oil sump, which facilitates lubricating oil entering the first shaft hole to flow to the oil sump, and facilitates the recovery of the lubricating oil.

In some embodiments, the housing of the motor has an oil return hole that connects the oil return channel with the oil sump.

The oil return hole is formed at the housing of the motor to connect the oil return channel with the oil sump, which facilitates lubricating oil entering the first shaft hole to flow to the oil sump.

In some embodiments, the flow guiding structure is also configured to guide a part of lubricating oil flowing out of the stator oil passage to the speed shifting mechanism.

By guiding a part of lubricating oil flowing out of the stator oil passage to the speed shifting mechanism by the flow guiding structure, the flow guiding structure guides lubricating oil flowing out of the stator oil passage to the speed shifting mechanism and the rotor oil passage to cool the rotor and lubricate the speed shifting mechanism.

In some embodiments, the speed shifting mechanism includes an input shaft, the input shaft has a second shaft hole formed in an axial direction of the input shaft, and the flow guiding structure is connected to the second shaft hole.

By guiding the lubricating oil to the second shaft hole by the flow guiding structure, the input shaft is cooled and the input shaft is also lubricated.

In some embodiments, the electric drive assembly includes two motors and two speed shifting mechanisms, the two motors and two speed shifting mechanisms being in one-to-one correspondence, the two motors are axially spaced apart from each other, and at least part of the two speed shifting mechanisms is located between the two motors.

By providing two motors and two speed shifting mechanisms, the integration of the two motors and the speed shifting mechanisms can be realized, improving the integration degree. At least part of the two speed shifting mechanisms is located between the two motors, so that the integration degree is further improved, and the volume of the electric drive assembly is reduced.

In some embodiments, the electric drive assembly further includes a controller, at least part of the controller is located between the two motors, and the two speed shifting mechanisms and the controller are located on two sides of a central axis of the motor.

By providing the controller, it is convenient to control the operation of the motor, the cooling and the lubrication of the speed shifting mechanism. By locating a part of the controller between the two motors and locating the speed shifting mechanism and the controller on two sides of the central axis of the motor, the integration degree is improved and the volume of the electric drive assembly is reduced.

In some embodiments, the two speed shifting mechanisms and the controller are arranged in a first direction, and the first direction is perpendicular to each of a height direction of the electric drive assembly and an axial direction of the motor.

By arranging the speed shifting mechanism and the controller in the first direction, it not only reduces the volume of the electric drive assembly but also reduces the space occupied in an application during use.

In some embodiments, the electric drive assembly further includes an oil sump, and the two speed shifting mechanisms is located above the oil sump.

By arranging the two speed shifting mechanisms above the oil sump, the oil return of the two speed shifting mechanisms can share one oil sump to reduce the occupied volume.

In some embodiments, the electric drive assembly includes two cooling systems, each of the two cooling systems is configured to supply lubricating oil to a corresponding motor and a corresponding speed shifting mechanism in sequence.

By providing two cooling systems to respectively supply lubricating oil to two motors and corresponding speed shifting mechanisms, it is convenient to control the oil supply to each motor and speed shifting mechanism, thereby facilitating the control of cooling for each motor and lubricating for each speed shifting mechanism, and facilitating the good operation of the electric drive assembly.

In some embodiments, the cooling system includes a flow diverting mechanism connected to the motor and configured to deliver the lubricating oil flowing out of the motor to the speed shifting mechanism.

By providing the flow diverting mechanism, it is convenient to guide lubricating oil from the motor to the speed shifting mechanism to lubricate the speed shifting mechanism.

In some embodiments, the flow diverting mechanism has an end connected to an oil outlet end of a stator oil passage of the motor and another end connected to each of an oil inlet end of a rotor oil passage of the motor and the speed shifting mechanism.

By connecting one end of the flow diverting mechanism to the oil outlet end of the stator oil passage, and the other end of the flow diverting mechanism to the oil inlet end of the rotor oil passage and the speed shifting mechanism, lubricating oil of the stator oil passage can cool the rotor and lubricate the speed shifting mechanism, so as to improve the utilization efficiency of lubricating oil.

In some embodiments, the speed shifting mechanism includes: an input shaft connected to the motor; an output shaft; and a transmission component in a driving connection with the input shaft and the output shaft; and the flow diverting mechanism includes a flow collecting tube connected to the motor; and a flow diverting tube connected to the flow collecting tube and configured to guide lubricating oil to the transmission component.

By providing the flow collecting tube to be connected to the motor, it is convenient to receive lubricating oil flowing out of the motor. By providing the flow diverting tube to guide lubricating oil in the flow collecting tube to the transmission component of the speed shifting mechanism, the transmission component can be lubricated. The structure is simple and easy to assemble.

In some embodiments, the flow diverting mechanism further includes a shunt plate connected to the flow collecting tube, the flow diverting tube is connected to the shunt plate, and the shunt plate has a flow diverting groove connecting the flow collecting tube with the flow diverting tube.

By providing the shunt plate and providing the flow diverting groove on the shunt plate, it is convenient to guide lubricating oil in the flow collecting tube to the flow diverting tube. The structure is simple, and easy to process, manufacture, install and fix. The integration degree can be improved and the occupied space can be reduced.

In some embodiments, the transmission component includes a first gear fixedly disposed at the input shaft, a second gear fixedly disposed at the output shaft, and at least one intermediate gear in transmission mesh with each of the first gear and the second gear. The speed shifting mechanism further includes an intermediate shaft configured to support the at least one intermediate gear; and the flow diverting tube includes: a first flow diverting tube extending to a position below which the first gear meshes with the at least one intermediate gear; and a second flow diverting tube extending to a position below which the second gear meshes with the at least one intermediate gear.

By providing the first flow diverting tube, it is convenient to guide lubricating oil to the region where the first gear meshes with the intermediate gear to lubricate the region where the first gear meshes with the intermediate gear, reducing the wear and tear. By providing the second flow diverting tube to guide lubricating oil to the region where the second gear meshes with the at least one intermediate gear so as to lubricate the region where the second gear meshes with the at least one intermediate gear, reducing the wear and tear.

In some embodiments, the speed shifting mechanism further includes a plurality of support bearings supporting the input shaft, the output shaft, and the intermediate shaft, respectively. The electric drive assembly further includes a casing having a bearing chamber for accommodating each of the plurality of support bearings. The flow diverting mechanism also includes a shunt tube configured to guide lubricating oil to the bearing chamber, and the shunt tube is connected to the flow collecting tube.

By providing the shunt tube to guide lubricating oil in the flow collecting tube to the bearing chambers, it is convenient to lubricate the support bearings of the speed shifting mechanism to ensure flexible and smooth operation of the speed shifting mechanism and reduce wear and tear.

In some embodiments, the flow diverting mechanism further includes a shunt plate connected to each of the flow collecting tube and the shunt plate; the shunt plate has a shunt groove connecting the flow collecting tube with the shunt tube.

By providing the shunt plate and providing the shunt groove on the shunt plate, it is convenient to guide lubricating oil in the flow diverting tube to the shunt tube. The structure is simple, and easy to process, manufacture, install and fix. The integration degree can be improved and the occupied space can be reduced.

In some embodiments, the support bearing includes a first bearing disposed at the input shaft, a second bearing disposed at the output shaft, and a third bearing disposed at the intermediate shaft. The bearing chamber includes a first bearing chamber configured for mounting of the first bearing, a second bearing chamber for accommodating the second bearing, and a third bearing chamber for accommodating the third bearing. The shunt tube includes a first shunt tube connecting the first bearing chamber with the third bearing chamber, and a second shunt tube connected to the second bearing chamber.

By providing the first shunt tube to guide lubricating oil to the first and third bearing chamber regions, it is convenient to lubricate the first and third bearings, reducing the wear and tear. By providing the second shunt tube to guide lubricating oil to the second bearing chamber to lubricate the second bearing, reducing the wear and tear.

In some embodiments, the casing has a first flow diverting channel connecting the first bearing chamber with an adjacent third bearing chamber, the first shunt tube extending to the first flow diverting channel; and/or the casing has a second flow diverting channel connected to the second bearing chamber, the second shunt tube extending to the second flow diverting channel.

By providing the first flow diverting channel in the casing, it is convenient to connect the first bearing chamber with the adjacent third bearing chamber. By connecting the first shunt tube with the first flow diverting channel, it is convenient to connect the first shunt tube with the first bearing chamber and an adjacent third bearing chamber.

By providing the second flow diverting channel in the casing, it is convenient to connect to the second bearing chamber. By connecting the second shunt tube with the second flow diverting channel, it is convenient to connect the second shunt tube with the second bearing chamber.

In some embodiments, the cooling system includes an oil supply passage configured to supply the lubricating oil to the motor, and the oil supply passage is provided with an oil pump configured to pump the lubricating oil to the motor.

By providing the oil supply passage to connect the motor, and providing the oil pump on the oil supply passage, it is convenient to pressurize lubricating oil to actively supply lubricating oil to the motor.

In some embodiments, the oil pump has an outlet, a filter is provided at the outlet.

By providing the filter at the outlet of the oil pump, it is convenient to filter the oil pumped by the oil pump to reduce impurities in the lubricating oil.

In some embodiments, the oil supply passage is provided with a heat exchanger configured to cool the lubricating oil entering the motor.

By providing the heat exchanger, it is convenient to cool the lubricating oil entering the motor so that the lubricating oil cools the motor.

In some embodiments, the oil supply passage is provided with a one-way valve for preventing a backflow of the lubricating oil.

By providing the one-way valve on the oil supply passage to prevent backflow of lubricating oil, it is convenient to supply lubricating oil to the motor.

In some embodiments, in a height direction of the motor, a lower part of the motor has an oil inlet, and an upper part of the motor has an oil outlet.

By providing the oil inlet of the motor in the lower part in the height direction, and providing the oil outlet in the upper part in the height direction, the internal heat generating portion of the motor is soaked in lubricating oil, so that the internal part of the motor is in a cooled environment and can be better cooled. By using lubricating oil to force gas out the motor, bubbles in the lubricating oil can be reduced and the cooling efficiency of the lubricating oil can be improved.

In a second aspect, an embodiment of this application provides an electric drive assembly including:

- two motors axially spaced apart from each other, each of the two motors including a stator oil passage configured to cool a stator of the motor and a rotor oil passage configured to cool a rotor of the motor;
- two speed shifting mechanisms respectively connected to the two motors, at least part of the two speed shifting mechanisms being located between the two motors;
- two oil supply passages configured to supply lubricating oil to two stator oil passages, respectively;
- two flow diverting mechanisms respectively connected to the two stator oil passages and configured to deliver a part of lubricating oil flowing out of each of the stator oil passages to the speed shifting mechanism; and
- a flow guiding structure configured to guide a part of the lubricating oil delivered by the two flow diverting mechanisms to the rotor oil passage.

In the technical solution of the embodiment of this application, two motors and two speed shifting mechanisms are provided so as to realize the integration of the two motors and the two speed shifting mechanisms. At least part of the two speed shifting mechanisms is located between the two motors, so as to improve the integration degree and reduce the volume of the electric drive assembly. Two oil supply passages are provided to respectively supply oil to the two stator oil passages of the two motors, so as to respectively control active cooling of the stator of each motor. Two flow diverting mechanisms are provided to respectively lubricate the two speed shifting mechanisms. In addition, a flow guiding structure is provided to guide lubricating oil delivered by the two flow diverting mechanisms to the rotor oil passage so as to cool the rotors of the two motors, thereby achieving the active lubrication of the speed shifting mechanism and the integrated cooling of the motor, so as to enable the electric drive assembly to operate well and improve the utilization efficiency of cold energy.

In a third aspect, embodiments of this application provide an electric device including an electric drive assembly according to any of the embodiments described above.

The above description is merely an overview of the technical solution of this application. In order to have a clearer understanding of the technical means of this application, it can be implemented according to the content of the specification. In order to make the above and other purposes, features, and advantages of this application more obvious and understandable, the specific implementation methods of this application are listed below.

BRIEF DESCRIPTION OF DRAWINGS

In order to more clearly illustrate the technical solutions of the embodiments of this application, a brief description will be given below of the accompanying drawings which are required to be used in the description of the embodiments. It is obvious that the drawings in the exemplary or technical description below are only some embodiments of this application, and it would be obvious for a person skilled in the art to obtain other drawings according to these drawings without involving any inventive effort.

REFERENCE NUMERALS OF THE ACCOMPANYING DRAWINGS

Figure 1:
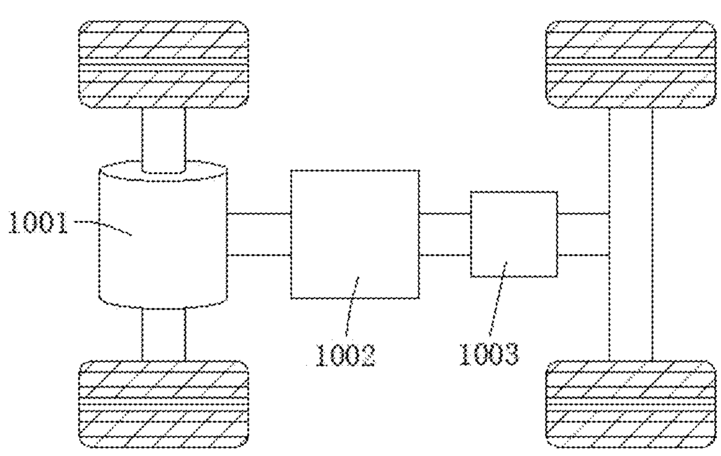
FIG. 1 is a structural schematic diagram of a vehicle provided in some embodiments of this application.

1000. Vehicle; 1001. Electric drive assembly; 1002. Control module; 1003. Battery;

10. Casing; 11. Accommodating cavity; 12. Bearing chamber; 121. First bearing chamber;

1211. First oil inlet; 122. Second bearing chamber; 123. Third bearing chamber;

13. First flow diverting channel; 14. Second flow diverting channel; 15. Partition;

151. First through hole; 152. Second through hole; 16. Connection channel;

20. Motor; 21. Rotor; 211. Rotor shaft; 22. Stator; 23. Stator oil passage;

24. Rotor oil passage; 241. First shaft hole; 25. Housing; 251. Oil return channel;

252. Oil return hole; 26. End cap;

30. Speed shifting mechanism; 31. Input shaft; 311. Second shaft hole; 32. Output shaft;

33. Intermediate shaft; 34. Transmission component; 341. First gear; 342. Second gear;

343. Intermediate gear; 35. Support bearing; 351. First bearing; 352. Second bearing;

353. Third bearing;

40. Cooling system;

50. Oil supply passage; 51. Oil pump; 52. Filter; 53. Heat exchanger; 54. One-way valve;

60. Flow diverting mechanism; 61. Flow collecting tube; 611. First opening;

612. Second opening; 613. First retaining wall; 614. Second retaining wall;

62. Flow diverting structure; 621. Shunt plate; 6211. Flow diverting groove;

6212. Shunt groove; 622. Flow diverting tube; 6221. First flow diverting tube;

6222. Second flow diverting tube; 623. Shunt tube; 6231. First shunt tube;

6232. Second shunt tube;

70. Flow guiding structure; 71. Flow guiding disc; 711. First flow guiding channel;

712. Second flow guiding channel; 7121. Notch; 7122. Connection flow passage;

72. Central tube; 73. Collar; 730. Recess; 74. Partition plate; 75. Baffle;

81. Oil sump; and 82. Controller.

DETAILED DESCRIPTION

In order that the technical problems, technical solutions and advantages to be solved by this application can be more clearly understood, this application will now be described in further detail with reference to the accompanying drawings and examples. It should be understood that the particular embodiments described herein are to explain this application rather than to limit this application.

Unless defined otherwise, all technical and scientific terms used herein have the same meaning as commonly understood by one of ordinary skill in the art to which this application belongs. The terminology used herein is for the purpose of describing particular embodiments only and is not intended to be limiting this application. The terms "including" and "comprising" and any variation thereof in the description and claims of this application and in the preceding description of the figures are intended to cover a non-exclusive inclusion.

In the description of the embodiments of this application, the technical terms "first", "second", etc. are only used to distinguish different objects and cannot be understood as indicating or implying relative importance or implying the quantity, specific order, or primary and secondary relationship of the indicated technical features. Thus, a feature defined as "first" or "second" may explicitly or implicitly include one or more of the features.

Reference herein to "embodiment" means that a particular feature, structure, or characteristic described in connection with the embodiment may be included in at least one example of this application. The appearances of the phrase in various places in the specification are not necessarily all referring to the same embodiment, nor are separate or alternative embodiments mutually exclusive of other embodiments. Technicians in this field explicitly and implicitly understand that the embodiments described herein can be combined with other embodiments in any suitable manner.

In the description of this application, the term "and/or", describing an associated relationship of an associated object only, means that three relationships may exist, for example, A and/or B, may mean three conditions: A is present alone, A and B are present together, and B is present alone. In addition, the word "/", as used herein, generally indicates that the associated object is an "or" relationship.

In the description of the embodiments of this application, the term "plurality" refers to two or more (including two), and similarly, "groups" refers to two or more (including two) groups, and "pieces" refers to two or more (including two) pieces. The meaning of "several" means one or more, unless specifically and specifically limited otherwise.

In the description of this application, it is to be understood that the terms "central", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", and the like, indicate the orientation or positional relationship based on the orientation or positional relationship shown in the accompanying drawings, which are only for the convenience of describing the embodiment of this application and simplifying the description, rather than indicating or implying that the referenced devices or elements must have a particular orientation, be constructed and operated in a particular orientation, and thus should not be construed as limiting the embodiment of this application.

In the descriptions of the embodiments of this application, unless otherwise specified and defined explicitly, the technical terms "mount", "connect", "join", and "fix" should be understood in their general senses. For example, they may refer to a fixed connection, a detachable connection, or an integral connection, may refer to a mechanical connection or an electrical connection, and may refer to a direct connection, an indirect connection via an intermediate medium, an internal communication between two elements, or an interaction between two elements. Persons of ordinary skill in the art can understand specific meanings of these terms in the embodiments of this application as suitable to specific situations.

In the description of the embodiments of this disclosure, unless otherwise specified and limited, when an element is referred to as being "fixed to" or "disposed on" another element, it can be directly on the other element or indirectly on the other element. When a component is referred to as "connected to" another component, it can be directly connected to another component or indirectly connected to that other component.

In the description of the embodiments of this application, unless expressly specified and limited otherwise, the technical term "adjacent" means close in position. For example, when $A_1$, $A_2$, and B are three components and the distance between $A_1$ and B is greater than the distance between $A_2$ and B, $A_2$ is closer to B than $A_1$, that is, $A_2$ is adjacent to B, or B is adjacent to $A_2$. For another example, when there are a plurality of C components which are respectively $C_1$, $C_2$, . . . , $C_N$, and one component C, such as $C_2$, is closer to the B component than the other C components, B is adjacent to $C_2$, or $C_2$ is adjacent to B.

A drive structure employing a motor as a power source is generally referred to as an electric drive. The electric drive assembly may be formed by integrating the motor with one or more of a cooling system, a speed shifting mechanism, a controller, etc. An electric drive assembly is also referred to as an electric drive assembly or electric drive. The electric drive assembly is the main power device of the electric vehicle. The electric drive assembly is used to convert the electric energy provided by the battery into mechanical energy to drive the electric vehicle to travel. At present, the electric drive assembly can be divided into a centralized electric drive assembly and a distributed electric drive assembly. The centralized electric drive assembly transmits the output torque of the motor to the left and right wheels of the electric vehicle through mechanical transmission drive such as a speed shifting mechanism and a speed reducer so as to drive the electric vehicle to travel. The distributed electric drive assembly generally includes at least two motors. The output torque of each motor is transmitted to one wheel so as to drive the electric vehicle to travel, so that the distributed electric drive assembly can achieve independent control on a single wheel of the electric vehicle. Therefore, compared with an electric vehicle adopting the centralized electric drive assembly, electric vehicles using distributed electric drive assemblies have better controllability, which makes distributed electric drive assemblies more and more popular with automobile manufacturers. A motor, also known as an electric motor (motor), generally consists of two parts, a rotor, and a stator. Motors are devices that convert electrical energy into mechanical energy. It uses an electrified coil to generate a rotating magnetic field and acts on a rotor to form a magneto-electric power rotating torque. The fixed part of the motor is called a stator (stator). The rotating part of the motor is called the rotor (rotor). In the motor, the rotor is driven to rotate by the stator, so as to convert electric energy into mechanical energy, so as to output torque. As the stator drives the rotor, heat is generated, which requires cooling of the motor structure to remove heat from the stator and rotor. In order for the motor to operate properly, lubricating oil needs to be supplied to remove heat from the stator and rotor.

In addition, in some cases, the motor does not directly output power. A speed shifting mechanism may be provided in the casing of the electric drive assembly. In some cases where a large torque is required, a speed reducer is often provided in the casing to increase the torque and output power through the speed reducer. In some cases where drive speed requirements are low, a speed reducer may also be used. In some cases where a higher rotational speed is required, a speed increaser is also required to increase the output rotational speed. That is, some electric drive assemblies also incorporate a speed shifting mechanism. A speed shifting mechanism, also referred to as a gearbox, is a mechanism for changing the speed and torque from a motor, which enables fixed or stepped changes in the speed shifting mechanism ratio of the output shaft and the input shaft. The speed shifting mechanism consists of a gear shifting transmission component. Transmission components are mostly driven by common gears, also by planetary gears, and also by belts. There is also frictional wear during operation of the speed shifting mechanism, which also requires lubricating oil to be supplied to reduce wear during operation of the speed shifting mechanism.

It can be seen from the above that in order to ensure the smooth operation of the electric drive assembly, good lubrication and cooling are required. Accordingly, an oil passage is provided in the electric drive assembly, and an oil pump is provided to pump lubricating oil so as to realize the circulation of lubricating oil, perform good lubrication, and remove heat generated during operation.

The lubricating oil circuit of the current electric drive assembly, generally an oil pump, after pressurizing lubricating oil, will cool through a heat exchanger, and then enter components such as a speed shifting mechanism and a motor for lubrication and cooling. However, in this design, the lubricating oil will consume the cooling capacity of the lubrication when passing through various components, resulting in low utilization of cooling capacity and requiring a high power of the heat exchanger.

Cold capacity is an energy or unit of energy concept. Cold capacity is the total amount of energy that a refrigeration apparatus or a heat-conducting facility, such as a heat exchanger, consumes or derives heat from a target space by refrigeration per unit time or period of time. Cold capacity is also often referred to as negative heat.

Based on the above-mentioned considerations, in order to solve the problems of low cooling efficiency and large loss of lubricating oil passage of the electric drive assembly, embodiments of this application provide an electric drive assembly, by providing a cooling system, lubricating oil is sequentially supplied to the motor and the speed shifting mechanism, reducing the loss of the cooling capacity of lubricating oil in the speed shifting mechanism, improving the cooling efficiency and the utilization rate of the cooling capacity, and reducing the loss.

The electric drive assembly disclosed in the embodiments of this application may be used as a power source for an electric device, such as in electric tools, electric bicycles, electric vehicles, ships, spacecraft, etc. Spacecraft may include, among others, aircraft, rockets, space vehicles, and spacecraft.

For the convenience of explanation, an embodiment of this application provides an electric device, which is illustrated using a vehicle as an example.

Refer to FIG. 1, which is a structural schematic diagram of a vehicle 1000 provided in some embodiments of this application. The vehicle 1000 may be a new energy vehicle, and the new energy automobile may be a pure electric automobile, a hybrid automobile, or an extended range automobile, etc. The interior of the vehicle 1000 is provided with an electric drive assembly 1001, which may be provided at the bottom, head or tail of the vehicle 1000 and drive the vehicle 1000 to travel. The vehicle 1000 may also include a control module 1002 configured to control the operation of the electric drive assembly 1001 and a battery 1003 configured to power the electric drive assembly 1001.

Figure 2:
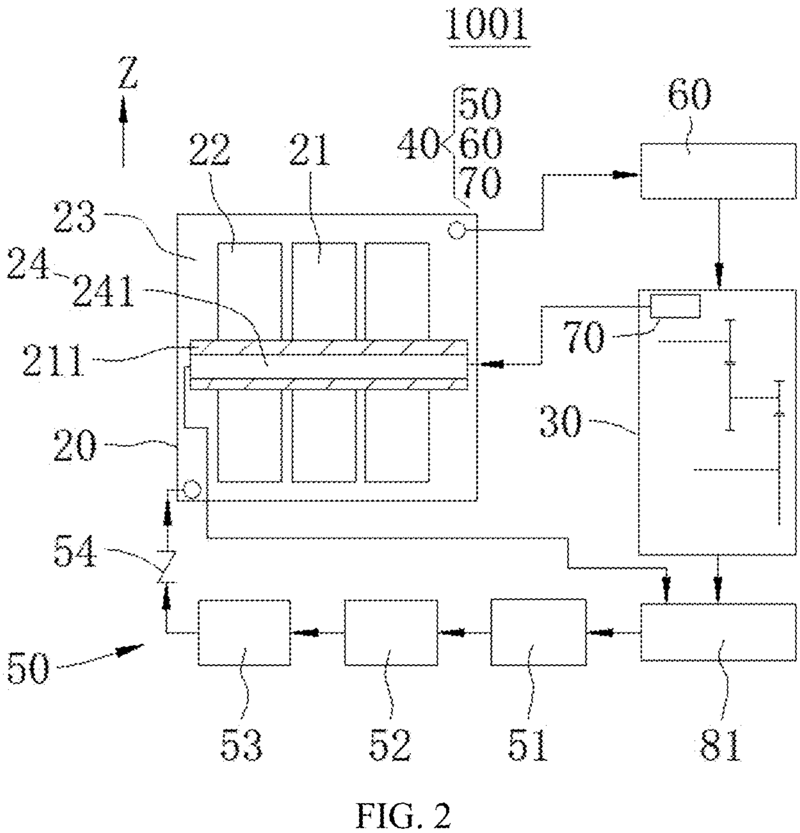
FIG. 2 is a schematic diagram of the structural framework of an electric drive assembly provided in some embodiments of this application.
Figure 3:
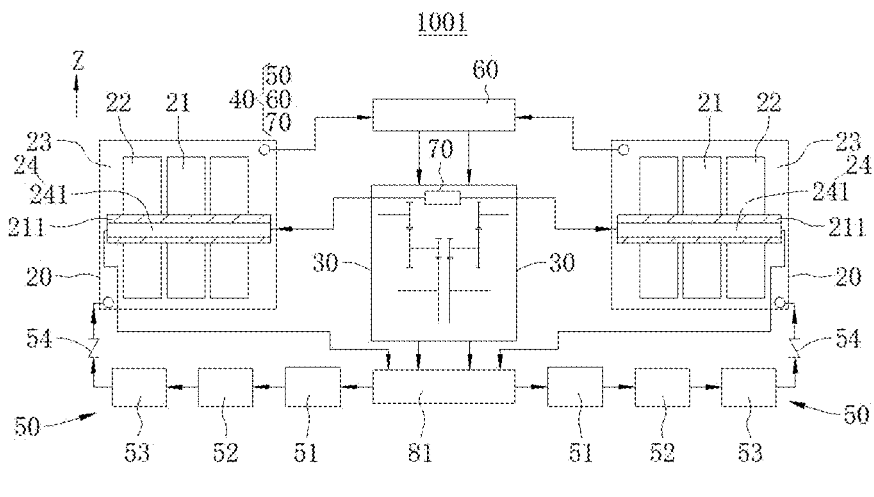
FIG. 3 is a schematic diagram of the structural framework of an electric drive assembly provided in other embodiments of this application.
Figure 4:
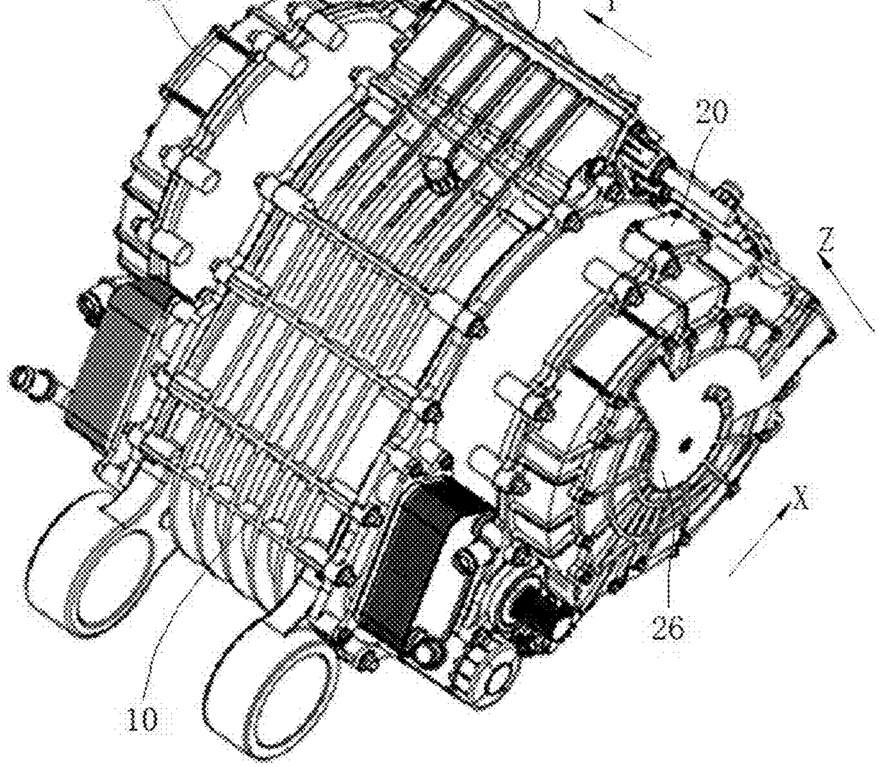
FIG. 4 is a structural schematic diagram of the electric drive assembly provided in other embodiments of this application.
Figure 5:
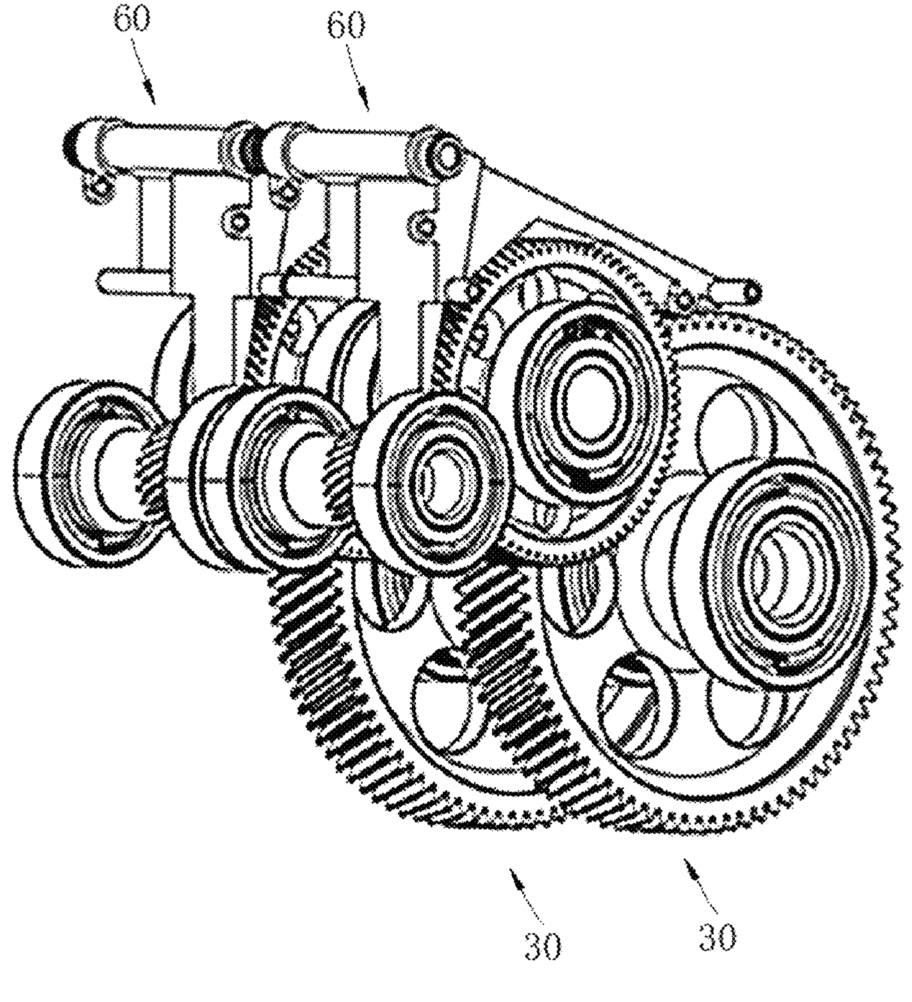
FIG. 5 is a structural schematic diagram of a combination of two speed shifting mechanisms and two flow diverting mechanisms in the electric drive assembly shown in FIG. 3.
Figure 6:
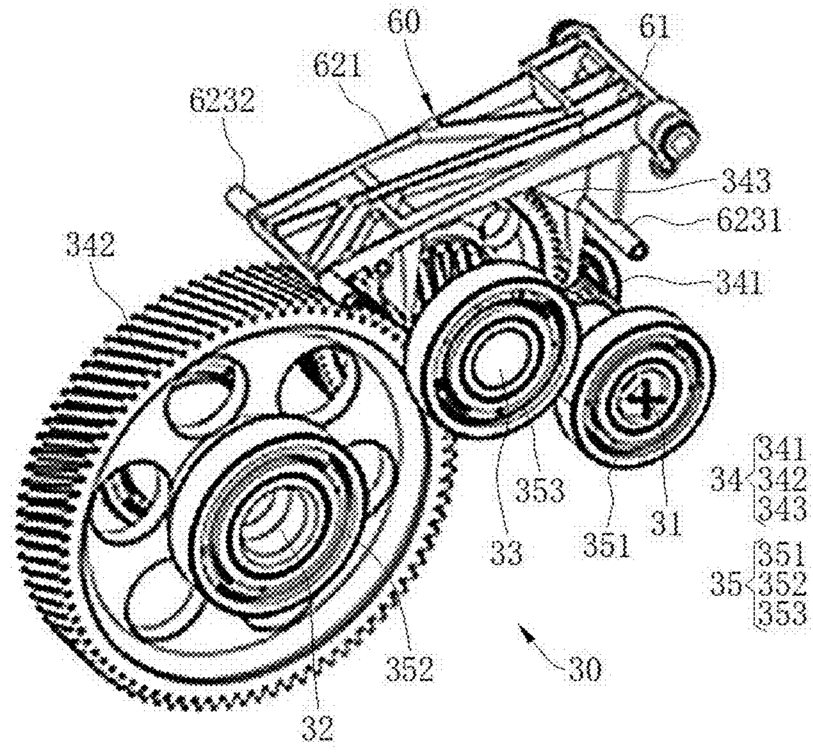
FIG. 6 is a structural schematic diagram of a combination of a single speed shifting mechanism and the corresponding flow diverting mechanism of FIG. 5.
Figure 7:
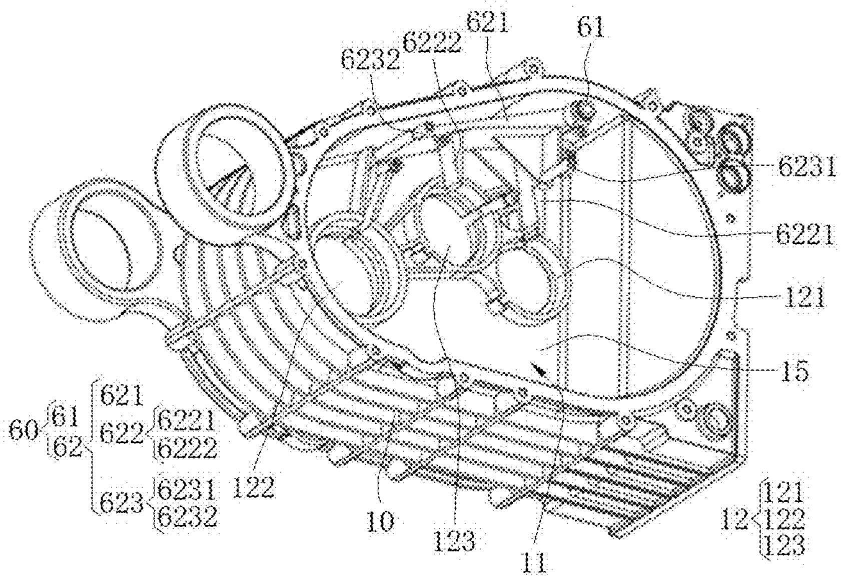
FIG. 7 is a structural schematic diagram of a combination of a casing and a flow diverting mechanism in the electric drive assembly provided in an embodiment of this application.

Referring to FIGS. 2-4, in accordance with some embodiments of this application, the electric drive assembly 1001 provided by this application includes: a motor 20; a speed shifting mechanism 30 connected to the motor 20; and a cooling system 40 configured to supply lubricating oil to the motor 20 and the speed shifting mechanism 30 in sequence.

The motor 20 is the power source component of the electric drive assembly 1001, and the motor 20 refers to an electromagnetic device for converting or transmitting electric energy according to the law of electromagnetic induction.

The speed shifting mechanism 30 is a mechanism for changing the speed and torque from a motor 20, which enables fixed or stepped changes in the speed shifting mechanism ratio of the output shaft and the input shaft. The speed shifting mechanism 30 may be a gear mechanism, a belt drive mechanism, or the like.

The speed shifting mechanism 30 is connected to the motor 20 and is driven by the motor 20 to output torque through the speed shifting mechanism 30.

The cooling system 40 refers to a structural system for supplying lubricating oil to cool the motor 20 and lubricating the speed shifting mechanism 30.

The cooling system 40 sequentially supplies lubricating oil to the motor 20 and the speed shifting mechanism 30, in other words, the cooling system 40 supplies the lubricating oil to the motor 20, so that the motor 20 is cooled. Then, the lubricating oil enters the speed shifting mechanism 30 after flowing out of the motor 20, so that the speed shifting mechanism 30 is lubricated.

Through the cooling system 40, the motor 20 and the speed shifting mechanism 30 are sequentially supplied with lubricating oil to reduce the loss of the cooling capacity of lubricating oil in the speed shifting mechanism 30, so as to improve the cooling efficiency and the utilization rate of the cooling capacity, and reduce the loss.

Since the cooling system 40 supplies oil to the motor 20 and cools the motor 20, the motor 20 has an oil inlet and an oil outlet, so that the lubricating oil enters and flows out of the motor 20.

The electric drive assembly 1001 has a height direction, a width direction, and a length direction. As shown in the drawings, the Z-axis direction is the height direction, the Y-axis direction is the width direction and the X-axis direction is the length direction. The Z-axis direction, the X-axis direction, and the Y-axis direction are perpendicular to each other. In an operation of the electric drive assembly 1001, the Z-axis direction is generally vertical, while the X-axis and Y-axis are two directions in the horizontal plane. Of course, a certain error or tilt may be allowed in specific use. Generally, in use, the axial direction of the motor 20 is along the Y-axis.

In some embodiments, the motor 20 includes a first heat generating portion and a second heat generating portion. The cooling system 40 supplies lubricating oil to the first heat generating portion and the second heat generating portion in turn.

The first heat generating portion refers to a part of a heating component in the motor 20, such as a stator 22, a rotor 21, or a control element.

The first heat generating portion refers to another portion of the heating components in the motor 20, such as the stator 22, the rotor 21, or a control element.

For example, when the first heat generating portion is at least part of the stator 22, the second heat generating portion may be at least part of the rotor 21. When the first heat generating portion is at least part of the rotor 21, the second heat generating portion may be at least part of the rotor 21.

By supplying lubricating oil to the first heat generating portion and the second heat generating portion of the motor 20 in sequence through the cooling system 40, serial cooling of lubricating oil to the inside of the motor 20 can be achieved, improving the utilization rate of cold energy and reducing the loss.

In some embodiments, the first heat generating portion includes a stator oil passage 23 for cooling the stator 22 of the motor 20. The cooling system 40 is connected to the stator oil passage 23.

The stator oil passage 23 is an oil passage that can receive lubricating oil in the motor 20 and cool the stator 22. Since lubricating oil flows through the stator oil passage 23 to cool the stator 22, the stator oil passage 23 has an oil inlet end and an oil outlet end. The oil inlet end of the stator oil passage 23 refers to an end through which lubricating oil enters the stator oil passage 23, and the oil outlet end of the stator oil passage 23 refers to an end through which lubricating oil flows out of the stator oil passage 23.

The stator oil passage 23 is connected to the cooling system 40 so that the cooling system 40 supplies lubricating oil to the stator oil passage 23 to cool the stator 22.

The stator oil passage 23 is provided in the motor 20 to cool the stator 22 of the motor 20 so that the stator 22 can be smoothly operated.

In some embodiments, the second heat generating portion includes a rotor oil passage 24 for cooling the rotor 21 of the motor 20. The cooling system 40 is connected to the rotor oil passage 24.

The rotor oil passage 24 is an oil passage that can receive lubricating oil in the motor 20 and cool the rotor 21. Since lubricating oil flows through the rotor oil passage 24 to cool the rotor 21, the rotor oil passage 24 has an oil inlet end and an oil outlet end. The oil inlet end of the rotor oil passage 24 refers to an end through which lubricating oil enters the rotor oil passage 24, and the oil outlet end of the rotor oil passage 24 refers to an end through which lubricating oil flows out of the rotor oil passage 24.

The rotor oil passage 24 is connected to a cooling system 40 so that the cooling system 40 supplies lubricating oil to the rotor oil passage 24 to cool the rotor 21.

The rotor oil passage 24 is provided in the motor 20 to cool the rotor 21 of the motor 20 so that the rotor 21 can smoothly operate.

In some embodiments, the electric drive assembly 1001 further includes a flow guiding structure 70 configured to guide a part of lubricating oil flowing out of the stator oil passage 23 to the rotor oil passage 24.

The flow guiding structure 70 refers to a structure that can guide at least part of lubricating oil flowing out of the stator oil passage 23 to the rotor oil passage 24. The form of the flow guiding structure 70 may be various, including but not limited to: a pipe through which lubricating oil is guided to the rotor oil passage 24. There may be a nozzle structure through which lubricating oil is injected into the rotor oil passage 24. There may be a channel structure connected to the rotor oil passage 24 to guide lubricating oil into the rotor oil passage 24.

In general, in the motor 20, the heat generated by the stator 22 is usually large. By providing the flow guiding structure 70 to guide a part of lubricating oil flowing out of the stator oil passage 23 to the rotor oil passage 24, it can not only cool the stator oil passage 23 firstly, so as to make full use of the cooling capacity in lubricating oil and improve the utilization rate of the cooling capacity but also realize the series connection between the stator oil passage 23 and the rotor oil passage 24, so as to improve the utilization rate of the cooling capacity of lubricating oil. Furthermore, based on the design of the flow guiding structure 70, the amount of lubricating oil entering the rotor oil passage 24 can be controlled, so as to reduce oil agitation loss when the rotor 21 rotates and improve the working efficiency of the motor 20.

In some embodiments, the motor 20 includes a rotor shaft 211. The rotor oil passage 24 has a first shaft hole 241 disposed in the rotor shaft 211. The first shaft hole 241 extends along an axial direction of the rotor shaft 211. The flow guiding structure 70 is connected to the first shaft hole 241.

The rotor shaft 211 refers to a shaft structure provided on the rotor 21. When the motor 20 is operated, power is output to the outside through the rotor shaft 211.

The first shaft hole 241 refers to a hole structure formed at the rotor shaft 211. The first shaft hole 241 extends in the axial direction of the rotor shaft 211. When lubricating oil flows through the first shaft hole 241, the rotor shaft 211 and in turn the rotor 21 can be cooled.

By providing the first shaft hole 241 in the rotor shaft 211 and connecting the flow guiding structure 70 with the first shaft hole 241, lubricating oil can be delivered to the rotor shaft 211 to cool the rotor 21, thereby providing a good temperature environment for rotor 21 operation.

In addition, the first shaft hole 241 is formed at the rotor oil passage 24, so that the rotor oil passage 24 is easily manufactured. Agitation of the lubricating oil by the rotor 21 can be reduced and agitation loss can be reduced.

In some embodiments, a spray structure may also be provided in a recess in the housing of the motor 20 where the rotor 21 portion is mounted to spray lubricating oil onto the rotor 21 to cool the rotor 21. The temperature of the rotor 21 and the oil agitation loss are well controlled by controlling the amount of the spray oil.

A housing 25 of the motor 20 refers to a housing structure that accommodate internal components of the motor 20, such as the stator 22 and the rotor 21.

In some embodiments, referring to FIGS. 8 and 10-13, the speed shifting mechanism 30 includes an input shaft 31. The input shaft 31 is coaxially connected to the rotor shaft 211. The input shaft 31 is axially provided with a second shaft hole 311. The flow guiding structure 70 is connected to the first shaft hole 241 through the second shaft hole 311.

The input shaft 31 refers to a shaft structure on the speed shifting mechanism 30, and is configured to be connected to the rotor shaft 211 of the motor 20, and drive other components of the speed shifting mechanism 30 to rotate through the input shaft 31. The input shaft 31 is coaxially connected to the rotor shaft 211, so that the rotor shaft 211 drives the input shaft 31 to rotate.

The second shaft hole 311 refers to a hole structure formed at the input shaft 31. When the rotor shaft 211 is connected to the input shaft 31, the second shaft hole 311 may be connected to the first shaft hole 241 in the rotor shaft 211.

The flow guiding structure 70 is connected to the first shaft hole 241 through the second shaft hole 311, in other words, the flow guiding structure 70 is connected to the second shaft hole 311 and in turn connected to the first shaft hole 241 through the second shaft hole 311.

The input shaft 31 is connected to the rotor shaft 211, so that the rotor shaft 211 drives the input shaft 31 to rotate. The second shaft hole 311 is formed at the input shaft 31, so that the second shaft hole 311 is connected to the first shaft hole 241. The flow guiding structure 70 can be connected to the first shaft hole 241 as long as the flow guiding structure 70 is connected to the second shaft hole 311, so as to guide lubricating oil to the first shaft hole 241, thereby cooling the rotor 21.

In some embodiments, the flow guiding structure 70 may also be in direct connection with the first shaft hole 241 of the rotor shaft 211.

In some embodiments, referring to FIGS. 5-8 and 10-13, an end of the input shaft 31 away from the rotor shaft 211 is provided with a first bearing 351.

The electric drive assembly 1001 further includes a casing 10. The casing 10 has an accommodating cavity 11 for accommodating the speed shifting mechanism 30 and a first bearing chamber 121 for mounting the first bearing 351 in cooperation therewith. The first bearing chamber 121 is in connection with the accommodating cavity 11. The cooling system 40 is in connection with the first bearing chamber 121. The flow guiding structure 70 guides part of lubricating oil in the first bearing chamber 121 to the second shaft hole 311.

The bearing is a structure for supporting the rotation of a shaft, and generally includes an outer ring, an inner ring, and a ball arranged between the outer ring and the inner ring. When the outer ring and the inner ring rotate relative to each other, friction force can be reduced to facilitate flexible rotation between the outer ring and the inner ring. The inner ring is typically mounted at the shaft and the outer ring is typically mounted in the bearing housing, so that the shaft is rotatably supported.

The first bearing 351 is a bearing supporting the input shaft 31. An end of the input shaft 31 away from the rotor shaft 211 is provided with a first bearing 351.

The casing 10 refers to the outer casing of the electric drive assembly 1001 to accommodate and support the internal components of drive assembly 1001.

The accommodating cavity 11 refers to a chamber provided in the casing 10 configured to accommodate and mount the speed shifting mechanism 30, that is, the speed shifting mechanism 30 is mounted in the accommodating cavity 11.

The bearing chamber refers to a chamber that accommodates and mounts a bearing. The first bearing chamber 121 refers to a chamber formed in the casing 10 and configured to fittingly mount the first bearing 351.

The first bearing chamber 121 is connected to the accommodating cavity 11, so that the first bearing 351 can be moved to the first bearing chamber 121 from the accommodating cavity 11 and mounted in the first bearing chamber 121, facilitating assembly. In addition, it is also convenient for lubricating oil lubricating the first bearing 351 in the first bearing chamber 121 to flow to the accommodating cavity 11.

The cooling system 40 is connected to the first bearing chamber 121 to supply lubricating oil into the first bearing chamber 121. The flow guiding structure 70 guides a part of lubricating oil in the first bearing chamber 121 to the second shaft hole 311, so as to supply lubricating oil to the second shaft hole 311 and in turn to supply lubricating oil into the first shaft hole 241, so that the rotor 21 is cooled.

In some embodiments, referring to FIGS. 7, 8, and 10-16, the first bearing chamber 121 has a first oil inlet 1211 in connection with the cooling system 40. The flow guiding structure 70 includes a flow guiding disc 71 mounted in the first bearing chamber 121, so that the flow guiding disc 71 is configured to receive lubricating oil from the first oil inlet 1211 and guide the lubricating oil to the second shaft hole 311 and the first bearing 351.

The first oil inlet 1211 refers to a hole or an opening structure provided in the first bearing chamber 121. The first oil inlet 1211 is provided in the first bearing chamber 121 so that the first bearing chamber 121 is connected to the cooling system 40, thereby facilitating the supply of lubricating oil into the first bearing chamber 121 through the cooling system 40.

The flow guiding disc 71 refers to a structural member configured to guide the flow direction of lubricating oil. The flow guiding disc 71 may be provided in a disc-shaped structure so as to facilitate manufacturing. Of course, the flow guiding disc 71 may be provided in a polygonal shape, an elliptical shape, or the like. The flow guiding disc 71 is mounted in the first bearing chamber 121 to mount and support the flow guiding disc 71 and to facilitate the flow of the lubricating oil in the first bearing chamber 121 by the flow guiding disc 71.

The first oil inlet 1211 is formed at the first bearing chamber 121, so that the first bearing chamber 121 is connected to the cooling system 40, it is convenient for the cooling system 40 to supply lubricating oil to the first bearing chamber 121. By providing the flow guiding disc 71, the lubricating oil entering the first oil inlet 1211 can be guided to the second shaft hole 311 and the first bearing 351, so that oil is supplied to the first shaft hole 241 through the second shaft hole 311 to cool the rotor 21, and oil is supplied to the first bearing 351 to lubricate the first bearing 351. The structure is simple, convenient for processing and manufacture, and can reduce the occupied space.

In some embodiments, the flow guiding disc 71 is provided with a central tube 72 extending in an axial direction of the flow guiding disc. The central tube 72 is connected to the second shaft hole 311. The flow guiding disc 71 has a first flow guiding channel 711. The first flow guiding channel 711 has an end connected to the central tube 72 and another end extending to a peripheral side surface of the flow guiding disc 71 and located adjacent to the first oil inlet 1211.

The central tube 72 refers to a tube structure provided on the flow guiding disc 71. The central tube 72 is disposed along the axial extension of the flow guiding disc 71.

The central tube 72 is connected to the second shaft hole 311 into which the central tube 72 can be inserted to connect the central tube 72 with the second shaft hole 311 and allow relative rotation of the central tube 72 and the input shaft 31. The central tube 72 may also be connected to the input shaft 31 such that the central tube 72 is connected to the second shaft hole 311.

The first flow guiding channel 711 refers to a channel structure formed at the flow guiding disc 71 and through which lubricating oil can flow.

The first flow guiding channel 711 has an end connected to the central tube 72 and another end extending to the peripheral side surface of the flow guiding disc 71, in other words, the first flow guiding channel 711 is connected to the central tube 72 and the peripheral side surface of the flow guiding disc 71, so that lubricating oil on the peripheral side surface of the flow guiding disc 71 can enter the central tube 72 through the first flow guiding channel 711.

The other end of the first flow guiding channel 711 is located adjacent to the first oil inlet 1211, in other words, one end of the first flow guiding channel 711 on the peripheral side surface of the flow guiding disc 71 is adjacent to the first oil inlet 1211, that is, the other end of the first flow guiding channel 711 is located adjacent to the first oil inlet 1211, so that the lubricating oil entering the first oil inlet 1211 flows to the first flow guiding channel 711 and then is guided to the central tube 72.

By providing a central tube 72 on the flow guiding disc 71, so that the flow guiding disc 71 is connected to the second shaft hole 311 and then to the first shaft hole 241. By providing a first flow guiding channel 711 in the flow guiding disc 71, so that the peripheral side surface of the flow guiding disc 71 is connected to the central tube 72. One end of the first flow guiding channel 711 away from the central tube 72 is located adjacent to the first oil inlet 1211, so that the lubricating oil entering the first oil inlet 1211 flows to the first flow guiding channel 711, then flows to the central tube 72, then is guided to the second shaft hole 311 through the central tube 72, and then flows to the first shaft hole 241 so as to cool the rotor 21. The structure is simple, convenient to manufacture, and easy to assemble. In some embodiments, the first flow guiding channel 711 extends radially of the flow guiding disc 71 to facilitate manufacturing. It will be appreciated that the first flow guiding channel 711 may also be curved so long as it can guide the incoming lubricating oil to the central tube 72.

In some embodiments, a side surface of the flow guiding disc 71 close to the first bearing 351 is provided with a collar 73 protruding in an axial direction of the flow guiding disc 71. The collar 73 is fitted with an outer ring of the first bearing 351 and has a recess 730 therein. The flow guiding disc 71 has a second flow guiding channel 712. The second flow guiding channel 712 has an end extending to the recess 730 and another end extending to the peripheral side surface of the flow guiding disc 71.

The collar 73 refers to an annular boss structure provided on the side surface of the flow guiding disc 71. The interior space of the collar 73 may thus form a recess 730.

The collar 73 being fitted with an outer ring of the first bearing 351 meant that when the flow guiding disc 71 and the first bearing 351 are mounted in the first bearing chamber 121, the collar 73 engages with the outer ring of the first bearing 351, so that lubricating oil entering the first bearing chamber 121 is blocked outside the first bearing 351 through the collar 73.

The second flow guiding channel 712 refers to a passage structure formed at the flow guiding disc 71 and through which lubricating oil can flow.

The second flow guiding channel 712 has an end extending to the recess 730 and another end extending to the peripheral side surface of the flow guiding disc 71, in other words, the second flow guiding channel 712 connects the recess 730 with the peripheral side surface of the flow guiding disc 71, so that lubricating oil on the peripheral side surface of the flow guiding disc 71 can enter the recess 730 through the second flow guiding channel 712. By providing the collar 73 on the flow guiding disc 71 so as to be fitted with the outer ring of the first bearing 351, the first bearing 351 can be positioned, lubricating oil entering the first bearing chamber 121 through the first oil inlet 1211 can flow along the peripheral side surface of the flow guiding disc 71 so as to facilitate lubricating oil entering the first flow guiding channel 711. By providing the recess 730 inside the collar 73, and providing the second flow guiding channel 712 on the flow guiding disc 71 so as to connect the peripheral side surface of the flow guiding disc 71 with the recess 730, lubricating oil flowing along the peripheral side surface of the flow guiding disc 71 can enter the recess 730 through the second flow guiding channel 712, and then enter the first bearing 351 from the recess 730, so as to lubricate the first bearing 351. The structure is simple, convenient to manufacture, and easy to assemble.

Figure 12:
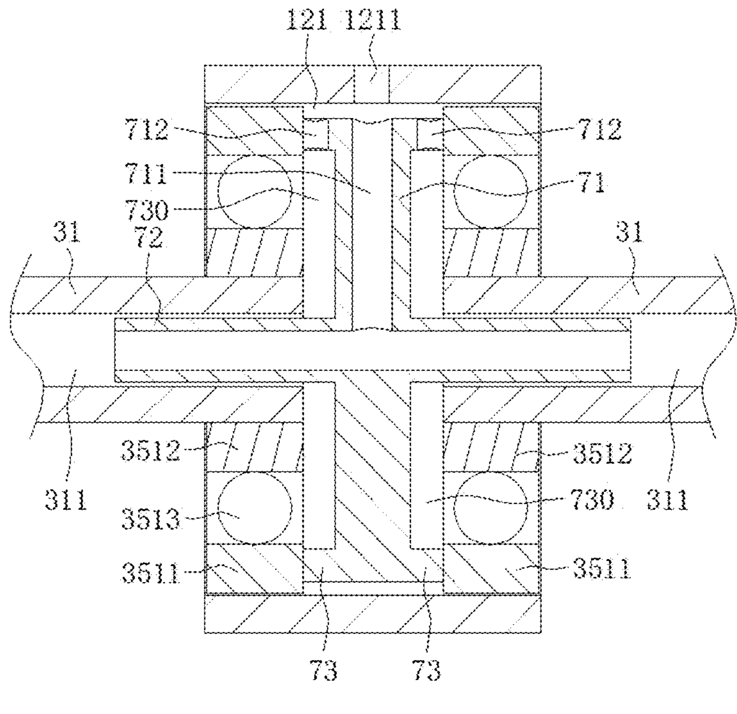
FIG. 12 is a structural schematic diagram of the flow guiding structure of FIG. 11 with the first bearing mounted in the first bearing chamber.
Figure 13:
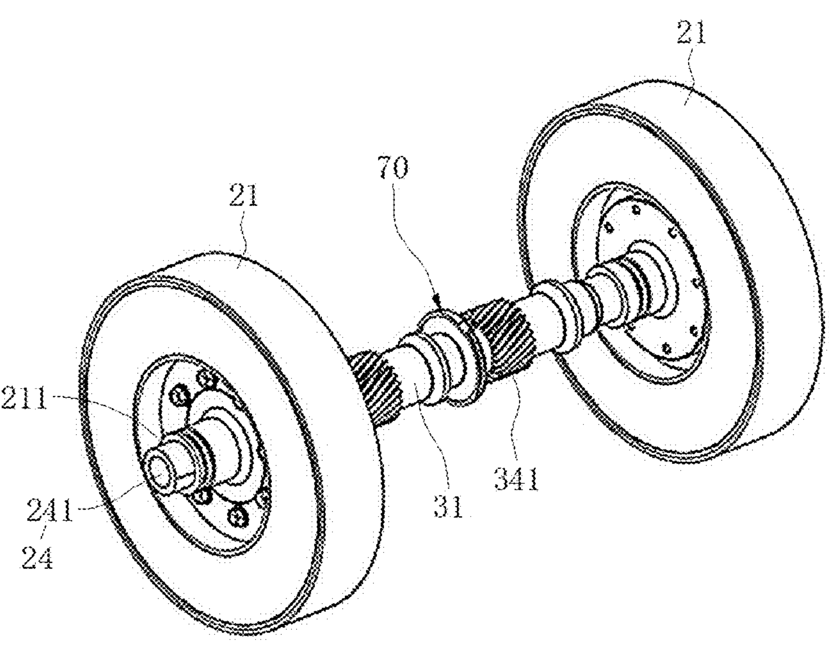
FIG. 13 is a structural schematic diagram of a combination of the input shaft, rotor and flow guiding structure of FIG. 11.
Figure 14:
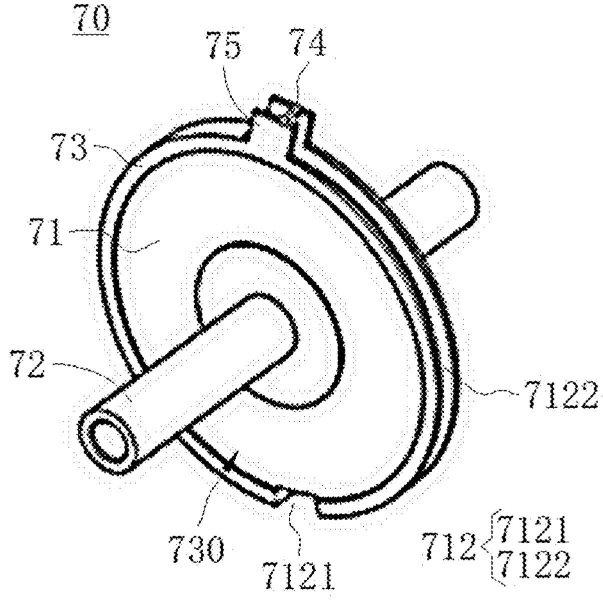
FIG. 14 is a structural schematic diagram of a flow guiding structure provided in an embodiment of this application.
Figure 15:
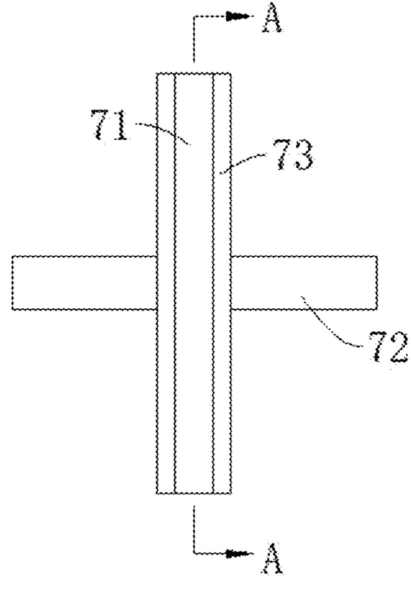
FIG. 15 is a side structural schematic diagram of the flow guiding structure of FIG. 14.
Figure 16:
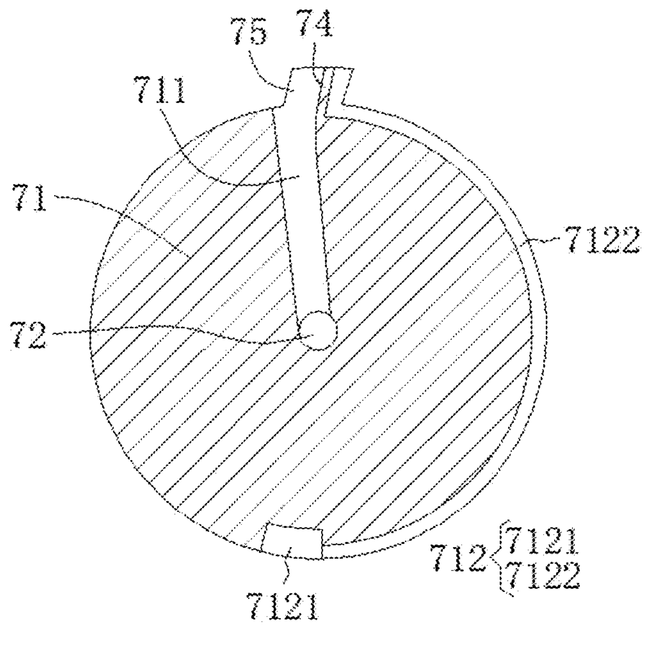
FIG. 16 is a cut view along line A-A of FIG. 15.

With reference to FIG. 12, the first bearing 351 generally includes, as an example of a rolling bearing, an outer ring 3511, an inner ring 3512, and a rolling element 3513. The rolling element 3513 is located between the outer ring 3511 and the inner ring 3512. In use, the outer ring 3511 is fixedly supported in the first bearing chamber 121, and the inner ring 3512 is fixedly connected to a rotating shaft, such as the input shaft 31. For lubricating the first bearing 351, lubricating oil needs to be sent to between the outer ring 3511 and the inner ring 3512, that is, to the rolling element 3513. The collar 73 is adjoined to the outer ring 3511 to position the first bearing 351. A part of lubricating oil introduced into the first bearing chamber 121 from the first oil inlet 1211 is introduced into the central tube 72 from the first flow guiding channel 711 and into the second shaft hole 311 of the input shaft 31 to supply lubricating oil to the second shaft hole 311. Another portion of lubricating oil introduced into the first bearing chamber 121 from the first oil inlet 1211 enters the recess 730 from the second flow guiding channel 712, and in turn enters between the outer ring 3511 and the inner ring 3512 of the first bearing 351 from the recess 730 so as to lubricate the rolling element 3513 of the first bearing 351.

In some embodiments, the other end of the second flow guiding channel 712 is located adjacent to the first oil inlet 1211.

The other end of the second flow guiding channel 712 is located on the peripheral side surface of the flow guiding disc 71 and is provided adjacent to the first oil inlet 1211, so that the lubricating oil entering the first oil inlet 1211 flows to the flow guiding disc 71 and is then guided to the recess 730 through the flow guiding disc 71.

In some embodiments, the flow guiding disc 71 may be fabricated separately and mounted in the first bearing chamber 121 to facilitate fabrication and assembly.

In some embodiments, the flow guiding disc 71 may also be integrally formed with the casing 10, that is, a structure in which the flow guiding disc 71 is formed directly during processing of the casing 10.

In some embodiments, the other end of the first flow guiding channel 711 is adjoined to the other end of the second flow guiding channel 712.

The other end of the first flow guiding channel 711 is an end of the first flow guiding channel 711 extending to the peripheral side surface of the flow guiding disc 71, and is also used as an inlet end of the first flow guiding channel 711.

The other end of the second flow guiding channel 712 is an end of the second flow guiding channel 712 extending to the peripheral side surface of the flow guiding disc 71, and is also used as an inlet end of the second flow guiding channel 712.

The other end of the first flow guiding channel 711 is adjoined to the other end of the second flow guiding channel 712, which not only facilitates processing and manufacture, but also facilitates the lubricating oil entering the first oil inlet 1211 to flow to the first and second flow guiding channels 711 and 712.

In some embodiments, a partition plate 74 is disposed between the other end of the first flow guiding channel 711 and the other end of the second flow guiding channel 712.

The partition plate 74 refers to a plate-shaped structure provided on the flow guiding disc 71. The partition plate 74 is located between the other end of the first flow guiding channel 711 and the other end of the second flow guiding channel 712, that is, the partition plate 74 is located between the inlet end of the first flow guiding channel 711 and the inlet end of the second flow guiding channel 712.

By providing the partition plate 74, the lubricating oil entering the first oil inlet 1211 flows to the first flow guiding channel 711 and the second flow guiding channel 712, respectively, so as to control the amount of lubricating oil entering the first flow guiding channel 711 and the second flow guiding channel 712, and in turn control the amount of lubricating oil entering the rotor shaft 211.

In some embodiments, the partition plate 74 may be disposed on the flow guiding disc 71 in a variety of modes.

For example, the partition plate 74 may be welded to the flow guiding disc 71 or integrally formed with the flow guiding disc 71.

In some embodiments, both sides of the partition plate 74 are provided with baffles 75 to cooperate with the partition plate 74, thereby guiding lubricating oil into the first and second flow guiding channels 711 and 712, respectively.

In some embodiments, the second flow guiding channel 712 has a notch 7121 formed at the collar 73, and the notch 7121 is in connection with the recess 730.

The notch 7121 refers to a mouth-shaped structure formed at the collar 73. The notch 7121 connects the recess 730 with the peripheral side surface of the flow guiding disc 71 so that lubricating oil on the peripheral side surface of the flow guiding disc 71 can enter the recess 730 from the notch 7121.

By providing a notch 7121 on the collar 73, the second flow guiding channel 712 can be formed. The structure is simple, and convenient to manufacture.

In some embodiments, the notch 7121 may be located in a lower part of the collar 73 in the height direction Z such that there is lubricating oil with a certain height on the outside of the flow guiding disc 71 in the first bearing chamber 121. The lubricating oil enters into the recess 730 from the notch 7121, so that the first bearing 351 is lubricated.

In some embodiments, when the notch 7121 is formed at a lower part of the collar 73 in the height direction Z, the connection flow passage 7122 may be provided at a peripheral side surface of the flow guiding disc 71 or inside the flow guiding disc 71, so that the flow guiding disc 71 is connected to the notch 7121 and guides lubricating oil to the notch 7121.

In some embodiments, the second flow guiding channel 712 may be formed at the flow guiding disc 71. One end of the second flow guiding channel 712 is located at the side of the flow guiding disc 71, that is, at the bottom of the depth direction of the recess 730, to guide lubricating oil directly into the recess 730.

In some embodiments, the first flow guiding channel 711 and the second flow guiding channel 712 may also share a segment. For example, a hole structure may be formed at the side of the first flow guiding channel 711, so that the first flow guiding channel 711 is connected to the recess 730, and lubricating oil in the first flow guiding channel 711 may flow into the central tube 72 and the recess 730, respectively.

Figure 17:
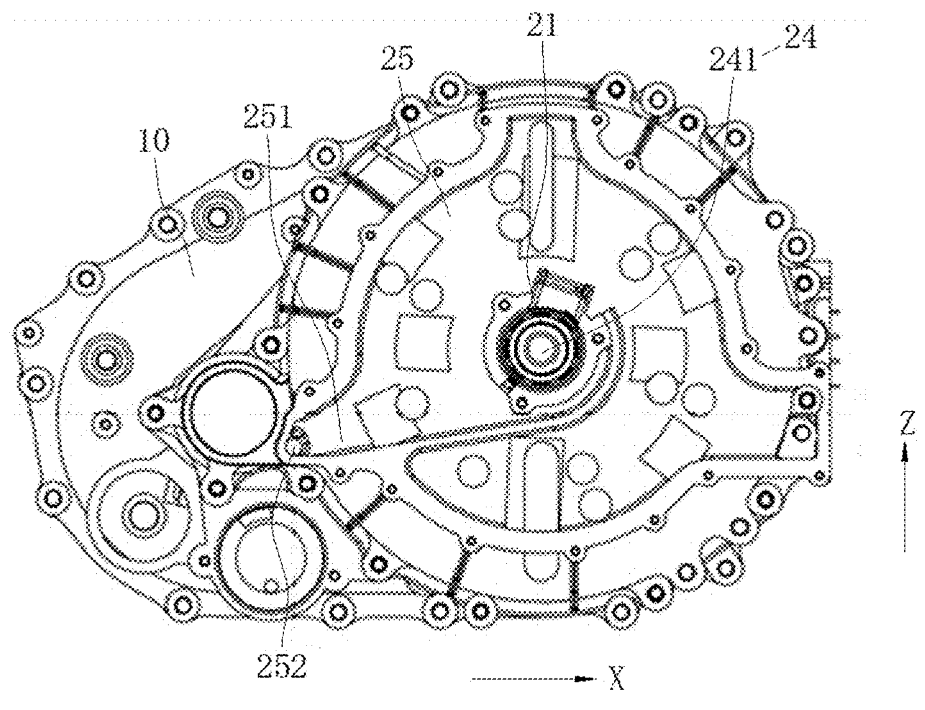
FIG. 17 is a side structural schematic diagram of a combination of a housing of the motor and a casing of the electric drive assembly provided in an embodiment of this application.

In some embodiments, referring to FIGS. 3, 4, and 17, an oil return channel 251 is provided at the housing 25 of the motor 20. The oil return channel 251 is in connection with an end of the first shaft hole 241 away from the speed shifting mechanism 30. The electric drive assembly 1001 further includes an oil sump 81, and the oil return channel 251 is in connection with the oil sump 81.

The oil return channel 251 refers to a passage for guiding lubricating oil to return to the oil sump 81 and may be a pipe, a channel, or the like.

The oil sump 81 refers to a space for accommodating lubricating oil. The oil sump 81 may be provided separately and mounted on the casing 10 of the electric drive assembly 1001. The bottom of the casing 10 can be used as an oil sump 81. For example, the bottom of the casing 10 in the height direction of the accommodating cavity 11 for mounting the speed shifting mechanism 30 is used as the oil sump 81, so as to improve the integration and also facilitate the backflow of lubricating oil.

The oil return channel 251 is disposed at the housing 25 of the motor 20 to connect the first shaft hole 241 with the oil sump 81, which facilitates lubricating oil entering the first shaft hole 241 to flow to the oil sump 81, and facilitates the recovery of lubricating oil.

In some embodiments, the oil sump 81 is formed at the bottom of the accommodating cavity 11 of the casing 10 in which the speed shifting mechanism 30 is mounted, that is, the oil sump 81 is formed at the bottom of the accommodating cavity 11 of the casing 10, so that the oil sump 81 does not need to be separately provided, simplifying the structure. The inner space of the accommodating cavity 11 of the casing 10 can be fully utilized. The backflow of lubricating oil on the speed shifting mechanism 30 can be facilitated.

The integration degree can be improved, and the volume of the electric drive assembly 1001 can be reduced.

In some embodiments, the housing 25 of the motor 20 has an oil return hole 252 that connects the oil return channel 251 with the oil sump 81.

The oil return hole 252 refers to an open hole structure provided on the housing 25 of the motor 20.

The oil return hole 252 is formed at the housing 25 of the motor 20 to connect the oil return channel 251 with the oil sump 81 which facilitates lubricating oil entering the first shaft hole 241 to flow to the oil sump 81.

In some embodiments, the oil return hole 252 may be disposed outside the housing 25 of the motor 20, and the outer side of the housing 25 of the motor 20 may need to be provided with an end cap 26 to cover the outer side of the housing 25 of the motor 20 for protection.

In some embodiments, the flow guiding structure 70 is also configured to guide a part of lubricating oil flowing out of the stator oil passage 23 to the speed shifting mechanism 30.

The flow guiding structure 70 guides a part of lubricating oil flowing out of the stator oil passage 23 to the speed shifting mechanism 30, so that the flow guiding structure 70 guides lubricating oil flowing out of the stator oil passage 23 to the speed shifting mechanism 30 and the rotor oil passage 24, so as to cool the rotor 21 and lubricate the speed shifting mechanism 30. The flow guiding structure 70 may take a variety of configurations including, but not limited to: a pipe member configured to guide lubricating oil flowing out of the stator oil passage 23 to the speed shifting mechanism 30 and the rotor oil passage 24.

In some embodiments, the speed shifting mechanism 30 includes an input shaft 31 that is axially perforated with a second shaft hole 311. The flow guiding structure 70 is in connection with the second shaft hole 311.

The flow guiding structure 70 guides the lubricating oil to the second shaft hole 311, so that the input shaft 31 is cooled and the input shaft 31 is also lubricated.

In some embodiments, referring to FIGS. 2, 3, and 5-9, the cooling system 40 includes a flow diverting mechanism 60 connected to the motor 20 and configured to deliver lubricating oil flowing out of the motor 20 to the speed shifting mechanism 30.

The flow diverting mechanism 60 can guide at least part of lubricating oil flowing out of motor 20 to speed shifting mechanism 30. Flow diverting mechanism 60 may take a variety of configurations, including but not limited to: a pipe through which lubricating oil is guided to the speed shifting mechanism 30. There may be a nozzle structure through which lubricating oil is injected into the speed shifting mechanism 30. There may also be a passage structure extending to connect to the speed shifting mechanism 30 to guide lubricating oil into the speed shifting mechanism 30.

By providing the flow diverting mechanism 60, it is convenient to guide lubricating oil from the motor 20 to the speed shifting mechanism 30 to lubricate the speed shifting mechanism 30.

In some embodiments, when the motor 20 includes the stator oil passage 23 and the rotor oil passage 24, and oil is first supplied to the stator oil passage 23, the flow diverting mechanism 60 may be connected to an oil outlet end of the stator oil passage 23, so that lubricating oil flowing out of the stator oil passage 23 may enter the flow diverting mechanism 60 which guides lubricating oil to the speed shifting mechanism 30.

In some embodiments, when the motor 20 includes the stator oil passage 23 and the rotor oil passage 24, and oil is first supplied to the rotor oil passage 24, the flow diverting mechanism 60 may be connected to an oil outlet end of the rotor oil passage 24, so that lubricating oil flowing out of the rotor oil passage 24 may enter the flow diverting mechanism 60 which guides lubricating oil to the speed shifting mechanism 30.

In some embodiments, the flow diverting mechanism 60 has an end connected to an oil outlet end of the stator oil passage 23 of the motor 20 and another end connected to each of the oil inlet end of the rotor oil passage 24 of the motor 20 and the speed shifting mechanism 30.

The flow diverting mechanism 60 has an end connected to the oil outlet end of the stator oil passage 23 and another end connected to the oil inlet end of the rotor oil passage 24, so that lubricating oil in the stator oil passage 23 cools the rotor 21. The other end of the flow diverting mechanism 60 is connected with the speed shifting mechanism 30 so as to lubricate the speed shifting mechanism 30 so as to improve the utilization efficiency of lubricating oil.

In some embodiments, the flow diverting mechanism 60 includes a flow collecting tube 61 connected to the oil outlet end of the motor 20.

The flow collecting tube 61 refers to a tube structure connected to an oil outlet end of the motor 20 to receive lubricating oil discharged from the motor 20.

The flow collecting tube 61 is provided so as to receive lubricating oil discharged from the motor 20 and to guide lubricating oil discharged from the motor 20 to the speed shifting mechanism 30.

In some embodiments, when the motor 20 includes the stator oil passage 23 and the rotor oil passage 24, and oil is firstly supplied to the stator oil passage 23, the flow collecting tube 61 is connected to the oil outlet end of the stator oil passage 23.

In some embodiments, when the motor 20 includes the stator oil passage 23 and the rotor oil passage 24, and oil is firstly supplied to the rotor oil passage 24, the flow collecting tube 61 is connected to the oil outlet end of the rotor oil passage 24.

In some embodiments, the flow diverting mechanism 60 further includes a flow diverting structure 62 configured to guide lubricating oil in the flow collecting tube 61 to the speed shifting mechanism 30. The flow diverting structure 62 is connected to the flow collecting tube 61.

The draining structure 62 refers to structures used to guide the flow of lubricating oil, including, but not limited to, pipe structures, trough structures, nozzles, and the like.

The flow diverting structure 62 is connected to the flow collecting tube 61 so that lubricating oil in the flow collecting tube 61 can flow to the flow diverting structure 62 so that the flow diverting structure 62 serves to guide lubricating oil in the flow collecting tube 61 to the speed shifting mechanism 30, thereby lubricating the speed shifting mechanism 30.

In some embodiments, the speed shifting mechanism 30 includes an input shaft 31 connected to the motor 20; an output shaft 32; and a transmission component 34 in a driving connection with the input shaft 31 and the output shaft 32. The flow diverting structure 62 includes a flow diverting tube 622 connected to the flow collecting tube 61 and configured to guide lubricating oil to the transmission component 34.

The input shaft 31 refers to a shaft structure on the speed shifting mechanism 30, and is configured to be connected to the rotor shaft 211 of the motor 20, and drive other components of the speed shifting mechanism 30 to rotate through the input shaft 31.

The input shaft 31 is connected to the motor 20 so that the motor 20 drives the input shaft 31 to rotate. When the motor 20 includes a rotor shaft 211, the input shaft 31 is coupled to the rotor shaft 211 of the motor 20.

The output shaft 32 refers to a shaft structure of the speed shifting mechanism 30 configured to be connected to an external device for power output.

The transmission component 34 is a component for transmitting power. The transmission component 34 typically employs a gear drive, also known as a planetary gear drive, as well as a belt drive.

The transmission component 34 drivingly connects the input shaft 31 and the output shaft 32, so that when the input shaft 31 rotates, the output shaft 32 is driven to rotate through the transmission component 34 to achieve power output.

The flow diverting tube 622 is a piping structure that guides the flow of lubricating oil.

The flow diverting tube 622 is connected to flow collecting tube 61 to guide lubricating oil from flow collecting tube 61 to the transmission component 34 to lubricate transmission component 34. The structure is simple and easy to assemble.

In some embodiments, the speed shifting mechanism 30 includes an input shaft 31 connected to the motor 20; an output shaft 32; a transmission component 34 drivingly connecting the input shaft 31 and the output shaft 32. The flow diverting mechanism 60 includes a flow collecting tube 61 connected to the motor 20; a flow diverting tube 622 connected to the flow collecting tube 61 and configured to guide lubricating oil to the transmission component 34.

The flow collecting tube 61 is disposed to be connected to the motor 20, which facilitates lubricating oil flowing out of the motor 20 to flow to the flow collecting tube 61. By providing the flow diverting tube 622 to guide lubricating oil in the flow collecting tube 61 to the transmission component 34 of the speed shifting mechanism 30, the transmission component 34 can be lubricated. The structure is simple and easy to assemble.

In some embodiments, the flow diverting mechanism 60 further includes a shunt plate 621 connected to the flow collecting tube 61. The flow diverting tube 622 is connected to the shunt plate 621. The shunt plate 621 has a flow diverting groove 6211 that connects the flow collecting tube 61 with the flow diverting tube 622.

The shunt plate 621 refers to a plate member structure that shunts lubricating oil. The flow diverting groove 6211 is a groove structure provided on the shunt plate 621 and guides the flow of lubricating oil.

The shunt plate 621 is connected to the flow collecting tube 61. The flow diverting tube 622 is connected to the shunt plate 621. The flow diverting groove 6211 connects the flow collecting tube 61 with the flow diverting tube 622, so that lubricating oil in the flow collecting tube 61 can flow to the flow diverting tube 622 through the flow diverting groove 6211, and then is guided to the speed shifting mechanism 30, thereby lubricating the speed shifting mechanism 30.

The shunt plate 621 is provided and the flow diverting groove 6211 is formed at the shunt plate 621, so that lubricating oil in the flow collecting tube 61 is guided to the flow diverting tube 622. The structure is simple, and easy to process, manufacture, install and fix. The integration degree can be improved and the occupied space can be reduced.

In some embodiments, the flow diverting structure 62, which may also be the flow diverting mechanism 60, includes a shunt plate 621. Because the flow diverting mechanism 60 includes the flow diverting structure 62, when the flow diverting structure 62 includes the shunt plate 621, the flow diverting mechanism 60 also includes the shunt plate 621.

In some embodiments, the transmission component 34 includes a first gear 341 fixedly disposed at the input shaft 31, a second gear 342 fixedly disposed at the output shaft 32, and at least one intermediate gear 343 in transmission mesh with each of the first gear 341 and the second gear 342. The speed shifting mechanism 30 further includes an intermediate shaft 33 configured to support the at least one intermediate gear 343. The flow diverting tube 622 includes a first flow diverting tube 6221 extending to a position below which the first gear 341 meshes with the at least one intermediate gear 343; and a second flow diverting tube 6222 extending to a position below which the second gear 342 meshes with the at least one intermediate gear 343.

The first gear 341 refers to a gear structure mounted on the input shaft 31, and when the input shaft 31 rotates, the first gear 341 can be driven to rotate.

The second gear 342 refers to a gear structure mounted on the output shaft 32, and can rotate the output shaft 32 when the second gear 342 rotates.

The intermediate gear 343 is a gear provided between the first gear 341 and the second gear 342 to achieve gears in drive connection. When the first gear 341 rotates, the intermediate gear 343 rotates to drive the second gear 342 to rotate. The intermediate gear 343 may be one, two, three, etc.

The intermediate shaft 33 refers to a shaft structure for supporting the intermediate gear 343 so that the intermediate gear 343 can rotate smoothly.

The first flow diverting tube 6221 refers to a pipe structure that guides the flow of lubricating oil. The first flow diverting tube 6221 extends to a position below which the first gear 341 meshes with the corresponding intermediate gear 343, so that lubricating oil guided out by the first flow diverting tube 6221 can reach the region where the first gear 341 meshes with the corresponding intermediate gear 343, so as to lubricate the region where the first gear 341 meshes with the intermediate gear 343, reducing the wear and tear.

The second flow diverting tube 6222 refers to a pipe structure that guides the flow of lubricating oil. The second flow diverting tube 6222 extends to a position below which the second gear 342 meshes with the corresponding intermediate gear 343, so that lubricating oil guided out by the second flow diverting tube 6222 can reach the region where the second gear 342 meshes with the corresponding intermediate gear 343, so as to lubricate the region where the second gear 342 meshes with the intermediate gear 343, reducing the wear and tear.

In some embodiments, the speed shifting mechanism 30 further includes a plurality of support bearings 35 that respectively support the input shaft 31, the output shaft 32, and the intermediate shaft 33. The electric drive assembly 1001 further includes a casing 10. The casing 10 is provided with a bearing chamber 12 configured to cooperatively accommodate each support bearing 35. The flow diverting mechanism 60 further includes a shunt tube 623 configured to guide lubricating oil to each of the bearing chambers 12. The shunt tube 623 is connected to the flow collecting tube 61.

The support bearing 35 refers to a bearing structure for supporting a shaft member. Support bearings 35 are provided on the input shaft 31, the output shaft 32, and the intermediate shaft 33, respectively, not only support the input shaft 31, the output shaft 32, and the intermediate shaft 33, but also facilitate flexible and smooth rotation of the input shaft 31, the output shaft 32, and the intermediate shaft 33.

The shunt tube 623 refers to a pipe structure that guides the flow of lubricating oil.

The shunt tube 623 is connected to the flow collecting tube 61 so as to guide lubricating oil in the flow collecting tube 61 to each of the bearing chambers 12 to lubricate the support bearings 35 of each of the bearing chambers 12.

By providing the shunt tube 623 to guide lubricating oil in flow collecting tube 61 to the bearing chambers 12, the support bearings 35 of the speed shifting mechanism 30 is lubricated, to ensure flexible and smooth operation of the speed shifting mechanism 30 and reduce wear and tear.

In some embodiments, the flow diverting structure 62, which may also be the flow diverting mechanism 60, includes a shunt tube 623. Because the flow diverting mechanism 60 includes the flow diverting structure 62, when the flow diverting structure 62 includes the shunt tube 623, the flow diverting mechanism 60 also includes the shunt tube 623.

In some embodiments, the flow diverting mechanism 60 further includes: a shunt plate 621 connected to the flow collecting tube 61. The shunt tube 623 is connected to the shunt plate 621. The shunt plate 621 is provided with a shunt groove 6212. The shunt groove 6212 connects the flow collecting tube 61 with the shunt tube 623.

The shunt plate 621 refers to a plate member structure that shunts lubricating oil. The shunt groove 6212 is a groove structure formed at the shunt plate 621 and guides the flow of lubricating oil.

The shunt plate 621 is connected to the flow collecting tube 61. The shunt tube 623 is connected to the shunt plate 621. The shunt groove 6212 connects the flow collecting tube 61 with the shunt tube 623, so that lubricating oil in the flow collecting tube 61 can flow to the shunt tube 623 through the shunt groove 6212, and then is guided to the speed shifting mechanism 30, thereby lubricating the speed shifting mechanism 30.

By providing the shunt plate 621 and providing the shunt groove 6212 on the shunt plate 621, it is convenient to guide lubricating oil in the flow collecting tube 61 to the shunt tube 623. The structure is simple, and easy to process, manufacture, install and fix. The integration degree can be improved and the occupied space can be reduced.

In some embodiments, the shunt plate 621 and the shunt tube 623 may be integrally formed structures to facilitate fabrication. Of course, the shunt plate 621 and the shunt tube 623 may be made separately and fixedly connected.

In some embodiments, the shunt plate 621 and the flow diverting tube 622 may be integrally formed structures to facilitate fabrication. Of course, the shunt plate 621 and the flow diverting tube 622 may be made separately and fixedly connected.

In some embodiments, the shunt plate 621 and the flow collecting tube 61 may be integrally formed to facilitate fabrication. Of course, the shunt plate 621 and the flow collecting tube 61 may be formed separately and fixedly connected.

In some embodiments, the side of the flow collecting tube 61 has a first opening 611 to connect the flow diverting groove 6211. The side of the flow collecting tube 61 has a second opening 612 to connect the shunt groove 6212. The bottom of the first opening 611 is convexly provided with a first retaining wall 613, and the bottom of the second opening 612 is convexly provided with a second retaining wall 614, so that lubricating oil can flow in the flow collecting tube 61. The lubricating oil in the flow collecting tube 61 overflows out of the first opening 611 and the second opening 612 to enter the flow diverting groove 6211 and the shunt groove 6212, so as to well distribute lubricating oil into the flow diverting groove 6211 and the shunt groove 6212.

In some embodiments, the support bearing 35 includes a first bearing 351 disposed at the input shaft 31, a second bearing 352 disposed at the output shaft 32, and a third bearing 353 disposed at the intermediate shaft 33. The bearing chamber 12 includes a first bearing chamber 121 configured for mounting of the first bearing 351, a second bearing chamber 122 accommodating the second bearing 352, and a third bearing chamber 123 accommodating the third bearing 353. The shunt tube 623 includes a first shunt tube 6231 connecting the first bearing chamber 121 with the third bearing chamber 123; and a second shunt tube 6232 connected to the second bearing chamber 122.

The first bearing 351 is a bearing for rotating the input shaft 31. The first bearings 351 may be respectively provided at both ends of the input shaft 31 to smoothly support the input shaft 31 so that the input shaft 31 can rotate flexibly. The first bearing 351 is mounted in the first bearing chamber 121.

The second bearing 352 is a bearing for rotating the output shaft 32. The second bearings 352 may be respectively provided at both ends of the output shaft 32 to smoothly support the output shaft 32 so that the output shaft 32 can rotate flexibly. The second bearing 352 is mounted in the second bearing chamber 122.

The third bearing 353 is a bearing for rotating the intermediate shaft 33. The third bearings 353 may be respectively provided at both ends of the intermediate shaft 33 to smoothly support the intermediate shaft 33 so that the intermediate shaft 33 can rotate flexibly. The third bearing 353 is mounted in the third bearing chamber 123.

The first shunt tube 6231 connects the first bearing chamber 121 and the third bearing chamber 123, so as to guide lubricating oil to the first bearing chamber 121 and the third bearing chamber 123. The first shunt tube 6231 connects the first bearing chamber 121 and the second bearing chamber 122, so that the structure is simple.

The second shunt tube 6232 is connected with the second bearing chamber 122 so as to guide lubricating oil to the second bearing chamber 122. The first shunt tube 6231 is connected with the second bearing chamber 122, so that the structure is simple.

By providing the first shunt tube 6231 to guide lubricating oil to the first and third bearing chamber regions 121 and 123, it is convenient to lubricate the first and second bearings 351 and 352, reducing the wear and tear. By providing the second shunt tube 6232 to guide lubricating oil to the second bearing chamber 122 to lubricate the third bearing 353, reducing the wear and tear.

In some embodiments, a plurality of shunt tubes 623 may be disposed to connect to each of the first bearing chamber 121, the second bearing chamber 122, and the third bearing chamber 123, respectively.

In some embodiments, the casing 10 has a first flow diverting channel 13 connecting the first bearing chamber 121 with an adjacent third bearing chamber 123. The first shunt tube 6231 extends to the first flow diverting channel 13.

Providing the first flow diverting channel 13 means a channel provided in the casing 10 for draining the flow of lubricating oil, including but not limited to a pipe structure, a groove structure, and a channel structure.

By providing the first flow diverting channel 13 in the casing 10, it is convenient to connect the first bearing chamber 121 with an adjacent third bearing chamber 123. By connecting the first shunt tube 6231 with the first flow diverting channel 13, it is convenient to connect the first shunt tube 6231 with the first bearing chamber 121 and an adjacent third bearing chamber 123.

In some embodiments, the casing 10 has a second flow diverting channel 14 connecting the second bearing chamber 122. The second shunt tube 6232 extends into the second flow diverting channel 14.

Providing the second flow diverting channel 14 means a channel provided in the casing 10 for draining the flow of lubricating oil, including but not limited to a pipe structure, a groove structure, and a channel structure.

By providing the second flow diverting channel 14 in the casing 10, it is convenient to connect the casing 10 with the second bearing chamber 122. By connecting the second shunt tube 6232 with the second flow diverting channel 14, it is convenient to connect the second shunt tube 6232 with the second bearing chamber 122.

In some embodiments, referring to FIGS. 2-4, the cooling system 40 includes an oil supply passage 50 configured to supply the lubricating oil to the motor 20. The oil supply passage 50 is provided with an oil pump 51 configured to pump the lubricating oil to the motor 20.

The oil supply passage 50 refers to a flow structure for supplying and flowing lubricating oil. The oil supply passage 50 includes, but is not limited to: pipes, ducts, channels and corresponding means for treating lubricating oil.

The oil pump 51 refers to a pumping member for adding lubricating oil, which includes, but not limited to: centrifugal pumps, gear pumps, plunger pumps, and the like, as long as they can be used as pumping elements for adding lubricating oil.

By providing the oil supply passage 50 to connect the motor 20, and providing the oil pump 51 on the oil supply passage 50, it is convenient to pressurize lubricating oil to actively supply lubricating oil to the motor 20.

In some embodiments, when the motor 20 includes the stator oil passage 23 and the rotor oil passage 24 and oil is firstly supplied to the stator oil passage 23, the oil pump 51 may be connected to an oil inlet end of the stator oil passage 23 to pump lubricating oil to the stator oil passage 23.

In some embodiments, when the motor 20 includes the stator oil passage 23 and the rotor oil passage 24, and oil is firstly supplied to the rotor oil passage 24, the oil pump 51 may be connected to an oil inlet end of the rotor oil passage 24 to pump lubricating oil to the rotor oil passage 24.

In some embodiments, the outlet of the oil pump 51 is provided with a filter 52.

The filter 52 is a device for filtering lubricating oil.

By providing the filter 52 at the outlet of the oil pump 51, it is convenient to filter the oil pumped by the oil pump 51 to reduce impurities in the lubricating oil.

In some embodiments, the oil supply passage 50 is provided with a heat exchanger 53 configured to cool the lubricating oil entering the motor 20.

The heat exchanger 53 refers to a device for cooling lubricating oil, and includes, but is not limited to: an air-cooling device, a heat exchanger, a semiconductor refrigeration device, etc.

By providing the heat exchanger 53, it is convenient to cool the lubricating oil entering the motor 20 so that the lubricating oil cools the motor 20.

In some embodiments, the oil supply passage 50 is provided with an oil pump 51, a filter 52, and a heat exchanger 53. An outlet of the oil pump 51 may be connected with the filter 52. The filter 52 may be connected with the heat exchanger 53. The heat exchanger 53 may be connected with an oil inlet of the motor 20.

In some embodiments, the oil supply passage 50 is provided with a one-way valve 54 for preventing a backflow of the lubricating oil.

One-way valve 54, also referred to as a check valve or non-return valve, refers to a directional control valve in which fluid can only flow in one direction but not in the opposite direction. By providing the one-way valve 54 on the oil supply passage 50 to prevent backflow of lubricating oil, it is convenient to supply lubricating oil to the motor 20.

In some embodiments, check valve 54 may be disposed at a location between the inlet of oil pump 51 to the oil inlet end of motor 20. For example, the check valve 54 may be provided at any one or more of the inlets of the oil pump 51, between the oil pump 51 and the filter 52, between the filter 52 and the heat exchanger 53, between the heat exchanger 53 and the motor 20, etc.

In some embodiments, in the height direction of the motor 20, a lower part of the motor 20 has an oil inlet, and an upper part of the motor has an oil outlet.

The height direction Z refers to the height direction of the electric drive assembly 1001 in use. The lower part of the motor 20 refers to the lower part in the height direction of the motor 20; the upper part of the motor 20 refers to the upper part in the height direction of the motor 20. The lower part and the upper part of the motor 20 may be bounded by the central axis of the motor 20, and the central axis of the motor 20 refers to the central axis of the rotor shaft 211 of the motor 20. The central axis of the motor 20 also refers to the central axis of the motor 20, and the "central axis" of the motor 20 refers to the axial centerline of the rotating shaft (or "rotor shaft") of the motor 20.

By providing the oil inlet of the motor 20 in the lower part in the height direction Z, and providing the oil outlet in the upper part in the height direction, during use, lubricating oil of the cooling system 40 needs to enter from the oil inlet of the motor 20, and after cooling the motor 20, flows out from the oil outlet of the motor 20, so that the inner heat generating portion of the motor 20 can be soaked in lubricating oil, and the inner part of the motor 20 is in a cooled environment to better cool the motor 20. By using lubricating oil to force gas out the motor 20, the risk of air entrapment is reduced, thereby reducing bubbles in lubricating oil and improving the cooling efficiency of lubricating oil.

In some embodiments, the oil inlet of the motor 20 may be provided at the bottom of the motor 20 in the height direction, and the oil outlet of the motor 20 may be provided at the top of the motor 20 in the height direction, so as to better force the gas out the motor 20.

In some embodiments, where motor 20 includes stator oil passage 23, the oil inlet of motor 20 may be the oil inlet end of stator oil passage 23 and the oil outlet of motor 20 may be the oil outlet end of stator oil passage 23.

In some embodiments, referring to FIGS. 3-6, the electric drive assembly 1001 includes two motors 20 and two speed shifting mechanisms 30 corresponding to the two motors 20. The two motors 20 are axially spaced apart, at least a part of the two speed shifting mechanisms 30 are located between the two motors 20.

By providing two motors 20 and two speed shifting mechanisms 30, the integration of the two motors 20 and the speed shifting mechanisms 30 can be realized, improving the integration degree. At least part of the two speed shifting mechanisms 30 is located between the two motors 20, so that the integration degree is further improved, and the volume of the electric drive assembly 1001 is reduced.

In some embodiments, the electric drive assembly 1001 further includes a controller 82. At least part of the controller 82 is located between the two motors 20. The two speed shifting mechanisms 30 and the controller 82 are located on two sides of a central axis of the motor 20.

The controller 82 refers to the components that control the operation of the whole or internal components of the electric drive assembly 1001, such as the components that control the operation of the motor 20, the cooling system 40, etc.

By providing the controller 82, it is convenient to control the operation of the motor 20, the cooling and the lubrication of the speed shifting mechanism 30. By locating a part of the controller 82 between the two motors 20 and locating the speed shifting mechanism 30 and the controller 82 on two sides of the central axis of the motor 20, the integration degree is improved and the volume of the electric drive assembly 1001 is reduced.

In some embodiments, the two speed shifting mechanisms 30 and the controller 82 are arranged in a first direction, the first direction being perpendicular to each of a height direction of the electric drive assembly 1001 and an axial direction of the motor 20.

The height direction Z of the electric drive assembly 1001 refers to the height direction of the electric drive assembly 1001 in use.

The first direction is perpendicular to the height direction Z of the electric drive assembly 1001, and the first direction is perpendicular to the axial direction of the motor 20. The axial direction of the motor 20 is along the width direction Y of the electric drive assembly 1001, and the first direction is along the length direction X of the electric drive assembly 1001.

By arranging the speed shifting mechanism 30 and the controller 82 in the first direction, it not only reduces the volume of the electric drive assembly 1001, but also reduces the space occupied by the disclosure when in use.

In some embodiments, the controller 82 has an insert portion disposed between the two motors 20. The length of the insert portion is less than the height of the insert portion to reduce the length space of the area between the two motors 20 occupied by the controller 82 while allowing the controller 82 to more fully utilize the height space of the area, such that the length dimension of the electric drive assembly 1001 is further reduced with the height dimension of the electric drive assembly 1001 unchanged, thereby further reducing the volume of the electric drive assembly 1001. The length of the insert portion refers to the length of the insert portion along the length direction X of the electric drive assembly 1001. The height of the insert portion refers to the height of the insert portion along the height direction Z of the electric drive assembly 1001.

In some embodiments, the controller 82 has the insert portion disposed between the two motors 20. The length of the insert portion is less than the width of the insert portion.

The length of the insert portion refers to the length of the insert portion along the length direction X of the electric drive assembly 1001. The width of the insert portion refers to the width of the insert portion along the width direction Y of the electric drive assembly 1001.

Since the width of the speed shifting mechanism 30 is generally large, and at least part of the speed shifting mechanism 30 is disposed in the region between the two motors 20, the length space of this region is smaller than the width space. By making the length of the insert portion smaller than the width of the insert portion, the length space of the electric drive assembly 1001 occupied by the controller 82 can be reduced, while allowing the controller 82 to more fully utilize the width space of the electric drive assembly 1001, such that the length dimension of the electric drive assembly 1001 can be further reduced with the width dimension of the electric drive assembly 1001 unchanged, thereby further reducing the volume of the electric drive assembly 1001.

For convenience of description below, the top side of the controller 82 in the height direction Z is defined as the top side of the controller 82, and the bottom side of the controller 82 in the height direction Z is defined as the bottom side of the controller 82.

The top side of the controller 82 does not protrude from the motor 20, that is, the top side of the controller 82 may be flush with the outer peripheral side of the motor 20 in the height direction Z, or may be recessed with respect to the outer peripheral side of the motor 20 in the direction of the rotation shaft of the motor 20. By the same reasoning, the bottom side of the controller 82 does not protrude from the motor 20, that is, the bottom side of the controller 82 may be flush with the outer peripheral side of the motor 20 in the height direction Z, or may be recessed with respect to the outer peripheral side of the motor 20 in the direction of the rotating shaft of the motor 20. Thus, the amount of protrusion of the controller 82 in the height direction Z relative to the motor 20 may be reduced, effectively reducing the height dimension of the electric drive assembly 1001, thereby further reducing the volume of the electric drive assembly 1001.

In some embodiments, when the electric drive assembly 1001 includes an oil sump 81 and two speed shifting mechanism 30, the two speed shifting mechanisms 30 are located above the oil sump 81.

By arranging the two speed shifting mechanisms 30 above the oil sump 81, the oil return of the two speed shifting mechanisms 30 can share one oil sump 81 to reduce the occupied volume.

In some embodiments, the cooling system 40 includes two cooling systems. Each of the two cooling systems 40 is configured to supply lubricating oil to a corresponding motor 20 and a corresponding speed shifting mechanisms 30 sequentially.

By providing the two cooling systems 40 to respectively supply lubricating oil to two motors 20 and corresponding speed shifting mechanisms 30, it is convenient to control the oil supply to each motor 20 and speed shifting mechanism 30, thereby facilitating the control of cooling for each motor 20 and lubricating for each speed shifting mechanism 30, so as to facilitate the good operation of the electric drive assembly 1001.

In some embodiments, when there are two cooling systems 40, the two cooling systems 40 are connected to the oil outlet ends of the two motors 20 such that each of the two cooling systems 40 are connected to the oil outlet ends of the motors 20. Each cooling system 40 can supply oil to the two speed shifting mechanisms 30 so as to achieve the complementarity of the two cooling systems 40 supplying oil to the two speed shifting mechanisms 30. Particularly when the drive assembly is inclined, the amount of lubricating oil supplied to each speed shifting mechanism 30 can be ensured so as to provide good lubrication to each speed shifting mechanism 30.

In some embodiments, when there are two cooling systems 40, each cooling system 40 including a flow diverting mechanism 60, the two flow diverting mechanisms 60 connect at the oil outlet end of the motor 20 so that lubricating oil in the two flow diverting mechanisms 60 can flow complementary to each other.

In some embodiments, the flow diverting mechanism 60 includes two, and when each flow diverting mechanism 60 includes a flow collecting tube 61, the two flow collecting tubes 61 are in connection with one end adjacent to each other. Each of the flow collecting tubes 61 is connected to the oil outlet end of the motor 20, so that the two motors 20 connect at the oil outlet end, and lubricating oil discharged from each of the motors 20 can enter the two flow collecting tubes 61.

In some embodiments, the two flow collecting tubes 61 are integrally formed to facilitate fabrication and also to facilitate connection of the two flow collecting tubes 61. It would be appreciated that the two flow collecting tubes 61 can also be made separately and connected directly or through a single channel.

Figure 8:
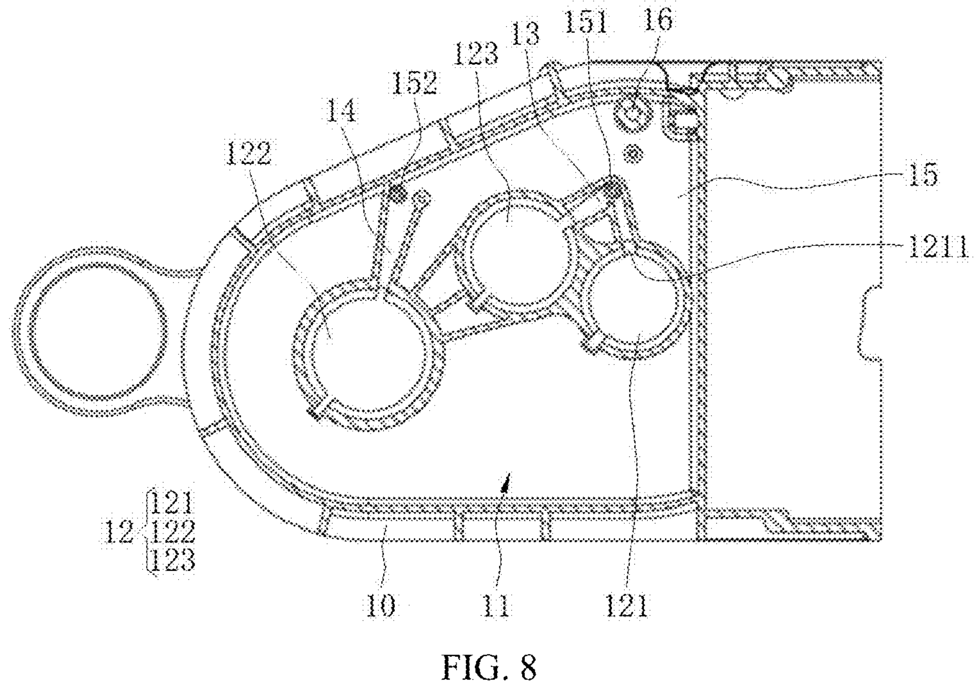
FIG. 8 is a front structural schematic diagram of the casing portion of FIG. 7.
Figure 9:
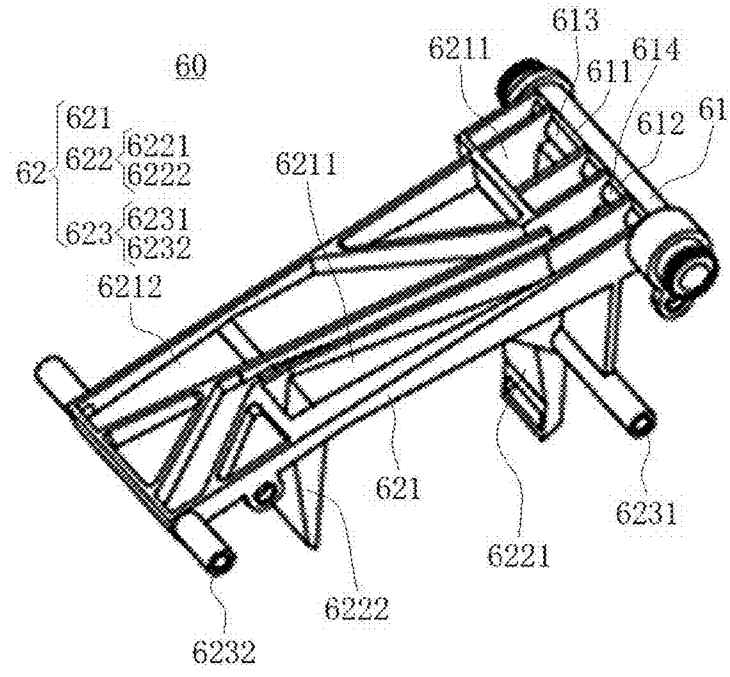
FIG. 9 is a structural schematic diagram of the flow diverting mechanism of FIG. 7.
Figure 10:
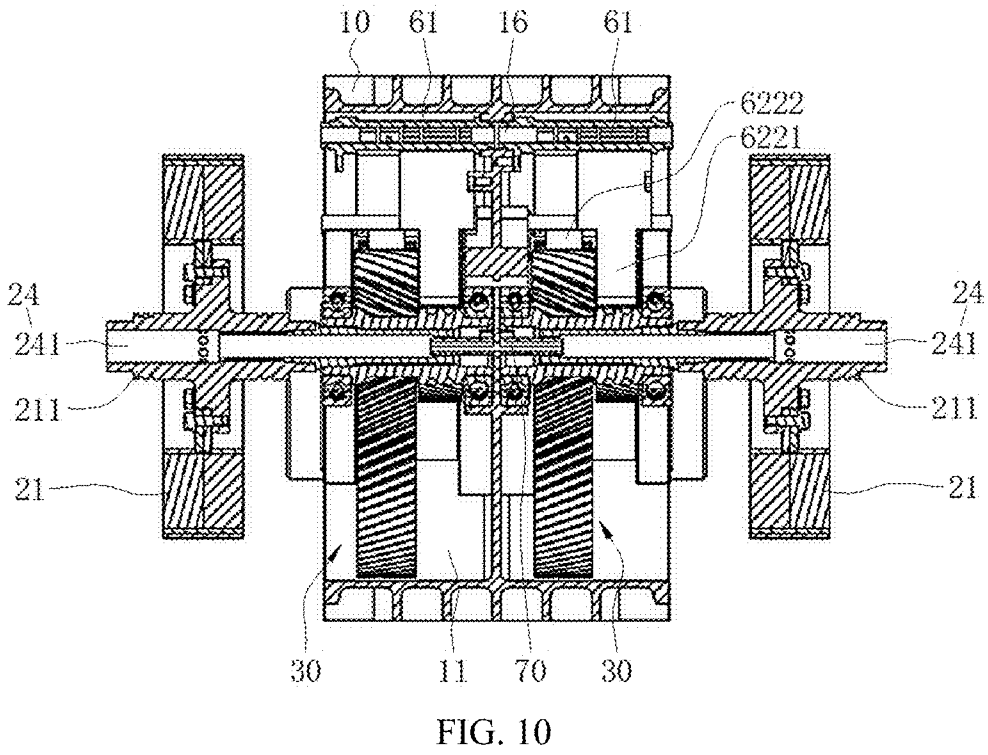
FIG. 10 is a structural schematic diagram of a combination of a casing, a speed shifting mechanism, a rotor, a flow diverting mechanism, and flow guiding structure in the electric drive assembly provided in an embodiment of this application.
Figure 11:
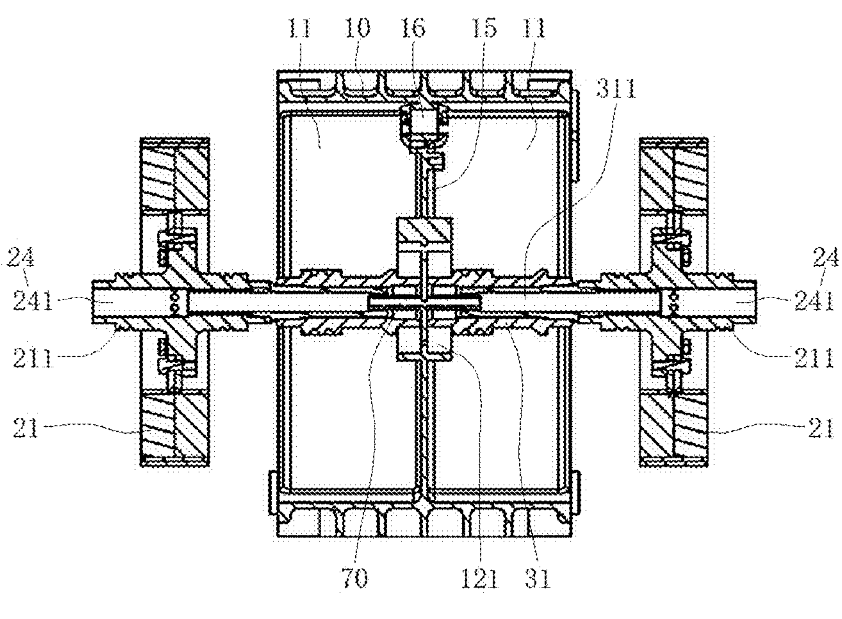
FIG. 11 is a structural schematic diagram of a combination of the casing, input shaft, rotor and flow guiding structure of FIG. 10.

In one embodiment, referring also to FIG. 8, when the electric drive assembly 1001 includes a casing 10 in which the flow collecting tube 61 is mounted, a connection channel 16 may be provided in the casing 10 to connect the two flow collecting tubes 61 to facilitate assembly of the flow collecting tubes 61.

In some embodiments, when two speed shifting mechanisms 30 are provided, the structures of the two speed shifting mechanisms 30 may be configured identically, and the two speed shifting mechanisms 30 may be configured side by side in translation, so as to facilitate manufacturing and reduce costs.

In some embodiments, when there are two flow diverting mechanisms 60, the structure of the two flow diverting mechanisms 60 may be the same, and the two flow diverting mechanisms 60 may be configured side by side in translation to facilitate manufacturing and reduce costs.

In some embodiments, when both ends of the input shaft 31 are provided with the first bearings 351, the casing 10 is provided with two axially adjacent first bearing chambers 121 in the region between the two speed shifting mechanisms 30 to accommodate the two adjacent first bearings 351.

In some embodiments, when both ends of the output shaft 32 are provided with second bearings 352, then the casing 10 is provided with two axially adjacent second bearing chambers 122 in the region between the two speed shifting mechanisms 30 to accommodate the two adjacent second bearings 352.

In some embodiments, when both ends of the intermediate shaft 33 are provided with third bearings 353, then the casing 10 is provided with two axially adjacent third bearing chambers 123 in the region between the two speed shifting mechanisms 30 to accommodate the two adjacent third bearings 353.

In some embodiments, since the first shunt tubes 6231 of the two flow diverting mechanisms 60 are required to supply oil to the two first bearing chambers 121 and the two third bearing chambers 123 between the two speed shifting mechanisms 30, the two first shunt tubes 6231 are respectively provided between the two speed shifting mechanisms 30.

In some embodiments, since the second shunt tubes 6232 of the two flow diverting mechanisms 60 are required to supply oil to the two second bearing chambers 122 between the two speed shifting mechanisms 30, two second shunt tubes 6232 are provided between the two speed shifting mechanisms 30, respectively.

In some embodiments, since a first flow diverting channel 13 is provided in the casing 10 so as to connect the first bearing chamber 121 with an adjacent third bearing chamber 123, the first flow diverting channel 13 between the two speed shifting mechanisms 30 can be connected to the two adjacent first bearing chambers 121, and the first flow diverting channel 13 between the two speed shifting mechanisms 30 can be connected with the two adjacent third bearing chambers 123. The corresponding two first shunt tubes 6231 between the two speed shifting mechanisms 30 are both connected to the first flow diverting channel 13, and the corresponding two first shunt tubes 6231 between the two speed shifting mechanisms 30 are connected at the first flow diverting channel 13, so that lubricating oil flowing out of the two motors 20 can each supply lubricating oil to the first bearing chamber 121 and the third bearing chamber 123 between the two speed shifting mechanisms 30.

In some embodiments, a partition 15 is provided in the casing 10. The partition 15 is a plate structure provided in the casing 10. The partition 15 is located between the two speed shifting mechanisms 30 to increase the structural strength of the casing 10 and also to support the respective bearing chambers 12.

In some embodiments, the partition 15 and the casing 10 may be integrally formed to facilitate fabrication. Of course, the partition 15 may be separately formed and fixed in the casing 10.

In some embodiments, ribs may be provided in the casing 10 to increase the structural strength of the casing 10 and to support the bearing chambers 12.

In some embodiments, a partition 15 is provided in the casing 10. The partition 15 is located between two speed shifting mechanisms 30. First flow diverting channels 13 are respectively provided on two sides of the partition 15. A first through hole 151 in connection with two adjacent first shunt tubes 6231 is provided on the partition 15.

The first through hole 151 is a hole structure opened in the partition 15.

A first through hole 151 is provided in the partition 15, and two corresponding first branches 6231 between the two speed shifting mechanisms 30 can be connected through the first through hole 151 to realize the complementarity of lubricating oil in the two first flow diverting channels 13.

In some embodiments, since a first flow diverting channel 13 is provided in the casing 10 so as to connect the first bearing chamber 121 with an adjacent third bearing chamber 123, the first flow diverting channel 13 between the two speed shifting mechanisms 30 can be connected to the two adjacent first bearing chambers 121, and the first flow diverting channel 13 between the two speed shifting mechanisms 30 can be connected to the two adjacent third bearing chambers 123. The corresponding two first shunt tubes 6231 between the two speed shifting mechanisms 30 are both connected to the first flow diverting channel 13. Thus, the corresponding two first shunt tubes 6231 between the two speed shifting mechanisms 30 are connected at the first flow diverting channel 13, so that lubricating oil flowing out of the two motors 20 can each supply lubricating oil to the first bearing chamber 121 and the third bearing chamber 123 between the two speed shifting mechanisms 30.

In some embodiments, the second flow diverting channel 14 between the two speed shifting mechanisms 30 is connected to two adjacent second bearing chambers 122, and each of the two corresponding second shunt tubes 6232 between the two speed shifting mechanisms 30 is connected to the second flow diverting channel 14, so that lubricating oil flowing out of the two motors 20 can each supply lubricating oil to the second bearing chambers 122 between the two speed shifting mechanisms 30.

In some embodiments, a partition 15 is provided in the casing 10. The partition 15 is located between two speed shifting mechanisms 30. Second flow diverting channels 14 are respectively provided on two sides of the partition 15. A second through hole 152 in connection with two adjacent second shunt tubes 6232 is provided on the partition 15.

The second through hole 152 refers to a hole structure opened in the partition 15.

The second through hole 152 is provided in the partition 15, and two corresponding second branch pipes 6232 between the two speed shifting mechanisms 30 can be connected through the second through hole 152 to realize the complementarity of lubricating oil in the two second flow diverting channels 14.

In some embodiments, two adjacent first bearing chambers 121 are in axial connection, that is, two corresponding first bearing chambers 121 between two speed shifting mechanisms 30 are in axial connection for ease of manufacturing and for case of lubricating oil supply to the two first bearing chambers 121 through two flow diverting mechanisms 60.

In some embodiments, two adjacent second bearing chambers 122 are in axial connection, that is, two corresponding second bearing chambers 122 between two speed shifting mechanisms 30 are in axial connection for case of manufacturing and for case of lubricating oil supply to the two second bearing chambers 122 by two flow directing mechanisms 60.

In some embodiments, two adjacent third bearing chambers 123 are in axial connection, that is, two corresponding third bearing chambers 123 between two speed shifting mechanisms 30 are in axial connection for ease of manufacturing and for ease of lubricating oil supply to the two third bearing chambers 123 by two flow diverting mechanisms 60.

In some embodiments, when there are two speed shifting mechanisms 30 and two motors 20, the flow guiding structure 70 may guide a part of lubricating oil delivered by the two diversion mechanisms 60 to the rotor oil passages 24 to supply oil to the rotor oil passages 24 of the two motors 20.

In some embodiments, when the flow guiding structure 70 includes a flow guiding disc 71, two first bearings 351 on a side of the two speed shifting mechanisms 30 away from the motor 20 may be clamped against the flow guiding disc 71 to position the two first bearings 351. The central tube 72 on the flow guiding disc 71 may extend to opposite sides to connect the second shaft holes 311 of the input shafts 31 of the two speed shifting mechanisms 30 to connect the first shaft holes 241 of the two rotor shafts 211 through the two second shaft holes 311.

In some embodiments, when there is two speed shifting mechanism 30, opposite sides of the flow guiding disc 71 are respectively provided with collars 73 which are adjoined to the outer rings of the two adjacent first bearings 351, and the second flow guiding channels 712 in the flow guiding disc 71 connect with the recesses 730 on opposite sides of the flow guiding disc 71 to guide lubricating oil into the two recesses 730 to supply lubricating oil to the rotating portions of the two first bearings 351.

According to some embodiments of this application, this application provides an electric drive assembly 1001, including: two motors 20 axially spaced apart from each other, each of the two motors 20 including a stator oil passage 23 configured to cool a stator 22 of the motor 20 and a rotor oil passage 24 configured to cool a rotor 21 of the motor 20; two speed shifting mechanisms 30 respectively connected to the two motors 20, at least part of the two speed shifting mechanisms 30 being located between the two motors 20; two oil supply passages 50 configured to supply lubricating oil to two stator oil passages 23, respectively; two flow diverting mechanisms 60 respectively connected to the two stator oil passages 23 and configured to deliver a part of lubricating oil flowing out of each of the stator oil passages 23 to the speed shifting mechanism 30; and a flow guiding structure 70 configured to guide a part of the lubricating oil delivered by the two flow diverting mechanisms 60 to the rotor oil passage 24.

Two motors 20 and two speed shifting mechanisms 30 are provided so as to realize the integration of the two motors 20 and the speed shifting mechanisms 30, and at least part of the two speed shifting mechanisms 30 is placed between the two motors 20 so as to improve the integration degree and reduce the volume of the electric drive assembly 1001. Two oil supply passages 50 are provided to respectively supply oil to the stator oil passages 23 of the two motors 20 so as to respectively control active cooling of the stator 22 of each motor 20. Two flow diverting mechanisms 60 are provided to respectively lubricate the two speed shifting mechanisms 30. In addition, a flow guiding structure 70 is provided to guide lubricating oil delivered by the two flow diverting mechanisms 60 to the rotor oil passage 24 so as to cool the rotors 21 of the two motors 20, thereby achieving the active lubrication of the speed shifting mechanism 30 and the integrated cooling of the motor 20, so as to enable the electric drive assembly 1001 to operate well and improve the utilization efficiency of cold energy.

In some embodiments, motor 20 may be divided into a radial motor and an axial motor. The radial motor, also referred to as a radial flux motor, is a motor in which a stator and a rotor are arranged in a radial direction, such as a motor in which the stator is located at the outer periphery of the rotor or the rotor is located at the outer periphery of the stator, that is, a motor in which the stator is sheathed at the outer periphery of the rotor or the rotor is sheathed at the outer periphery of the stator is a radial motor. The axial motor, also called axial flux motor, is a motor in which a stator and a rotor are axially arranged.

According to some embodiments of this application, this application also provides an electric device including the electric drive assembly 1001 of any of the above aspects.

Finally, it should be noted that the above embodiments are only used to illustrate the technical solution of this disclosure and not to limit it. Although this application has been described in detail with reference to the aforementioned embodiments, ordinary technical personnel in the art should understand that they can still modify the technical solutions recorded in the aforementioned embodiments, or equivalently replace some or all of the technical features. These modifications or substitutions do not separate the essence of the corresponding technical solutions from the scope of the technical solutions of the various embodiments of this disclosure, and they should all be covered within the scope of the claims and specifications of this disclosure. In particular, the technical features mentioned in the various embodiments can be combined in any manner as long as there is no structural conflict. This disclosure is not limited to the particular embodiments disclosed herein, but includes all embodiments falling within the scope of the claims.

What is claimed is:

1. An electric drive assembly, comprising:

two motors axially spaced apart from each other, each of the two motors comprising a stator oil passage configured to cool a stator of the motor using lubricating oil and a rotor oil passage configured to cool a rotor of the motor using the lubricating oil;

two speed shifting mechanisms respectively connected to the two motors, at least part of the two speed shifting mechanisms being located between the two motors;

two oil supply passages configured to supply the lubricating oil to the two stator oil passages, respectively;

a flow diverting mechanism connected to the two stator oil passages and configured to deliver a part of the lubricating oil flowing out of each of the stator oil passages to the speed shifting mechanisms; and a flow guiding structure connected between the two motors, wherein the flow guiding structure is configured to guide a part of the lubricating oil delivered by the two-flow diverting mechanism to the two stator oil passages, and guide a part of the lubricating oil flowing out of the two stator oil passages to the two rotor oil passages;

wherein each motor includes a rotor shaft, each rotor oil passage has a first shaft hole formed in the rotor shaft and extending in an axial direction of the rotor shaft, one end of the flow guiding structure is connected to one first shaft hole, and another end of the flow guiding structure is connected to another first shaft hole; and wherein the flow guiding structure comprises a circular flowing guiding disc, a first flow guiding channel is formed inside the flow guiding disc, one end of the first flow guiding channel extends to a peripheral side surface of the flow guiding disc, another end of the first flow guiding channel is connected to a central tube located in the center of the flow guiding disc, the first flow guiding channel is configured to guide the lubricating oil to flow to the rotor oil passages.

2. The electric drive assembly according to claim 1, wherein each motor comprises a first heat generating portion and a second heat generating portion, and the lubricating oil is supplied to cool the first heat generating portion and the second heat generating portion in sequence.

3. The electric drive assembly according to claim 2, wherein the first heat generating portion comprises the stator and the stator oil passage is configured to cool the stator using the lubricating oil.

4. The electric drive assembly according to claim 3, wherein the second heat generating portion comprises the rotor and the rotor oil passage is configured to cool the rotor using the lubricating oil.

5. The electric drive assembly according to claim 1, wherein each speed shifting mechanism comprises an input shaft coaxially connected to the rotor shaft, the input shaft has a second shaft hole formed in an axial direction of the input shaft, and the flow guiding structure is connected to the first shaft hole through the second shaft hole.

6. The electric drive assembly according to claim 5, wherein an end of the input shaft facing away from the rotor shaft is provided with a first bearing;

the electric drive assembly further comprises a casing, the casing has an accommodating cavity configured to accommodate the speed shifting mechanism and a first bearing chamber configured for mounting of the first bearing;

the first bearing chamber is connected to the accommodating cavity; and the flow guiding structure guides a part of lubricating oil in the first bearing chamber to the second shaft hole.

7. The electric drive assembly according to claim 1, wherein each motor further comprises a housing, the housing having an oil return channel connected to an end of the first shaft hole facing away from the speed shifting mechanism; and the electric drive assembly further comprises an oil sump connected to the oil return channel.

8. The electric drive assembly according to claim 7, wherein the housing of the motor has an oil return hole that connects the oil return channel with the oil sump.

9. The electric drive assembly according to claim 1, wherein each speed shifting mechanism comprises an input shaft, the input shaft has a second shaft hole formed in the axial direction of the input shaft, and the flow guiding structure is connected to the second shaft hole.

10. The electric drive assembly according to claim 1, wherein the electric drive assembly further comprises a controller, at least part of the controller is located between the two motors, and the two speed shifting mechanisms and the controller are located at two sides of a central axis of the motors, respectively.

11. The electric drive assembly according to claim 10, wherein the two speed shifting mechanisms and the controller are arranged in a first direction, the first direction being perpendicular to each of a height direction of the electric drive assembly and an axial direction of the motor.

12. The electric drive assembly according to claim 1, wherein the flow diverting mechanism has one end connected to an oil outlet end of the stator oil passage of the motor and another end connected to each of an oil inlet end of the rotor oil passage of the motor and the speed shifting mechanism.

13. The electric drive assembly according to claim 1, wherein the oil supply passage comprises an oil pump configured to pump the lubricating oil to the motor.

14. An electric device, comprising the electric drive assembly according to claim 1.

* * * * *